United States Patent
Achten et al.

(10) Patent No.: US 11,124,682 B2
(45) Date of Patent: *Sep. 21, 2021

(54) FROST-RESISTANT ADHESIVES BASED ON POLYISOCYANATES

(71) Applicant: Covestro Deutschland AG, Leverkusen (DE)

(72) Inventors: Dirk Achten, Leverkusen (DE); Florian Golling, Düsseldorf (DE); Frank Sicking, Overath (DE); Olaf Fleck, Bergisch Gladbach (DE); Martin Melchiors, Leichlingen (DE); Christoph Thiebes, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/772,830

(22) PCT Filed: Dec. 14, 2018

(86) PCT No.: PCT/EP2018/084941
§ 371 (c)(1),
(2) Date: Jun. 15, 2020

(87) PCT Pub. No.: WO2019/121388
PCT Pub. Date: Jun. 27, 2019

(65) Prior Publication Data
US 2021/0047547 A1 Feb. 18, 2021

(30) Foreign Application Priority Data
Dec. 21, 2017 (EP) .................................... 17209387

(51) Int. Cl.
C08G 18/32 (2006.01)
C09J 175/04 (2006.01)
C08G 18/70 (2006.01)

(52) U.S. Cl.
CPC ........ *C09J 175/04* (2013.01); *C08G 18/3206* (2013.01); *C08G 18/706* (2013.01)

(58) Field of Classification Search
CPC .. C08G 18/0866; C08G 18/10; C08G 18/225; C08G 18/3206; C08G 18/706; C08G 18/73; C09D 175/04
See application file for complete search history.

(56) References Cited

U.S. PATENT DOCUMENTS

| | | |
|---|---|---|
| 3,487,080 A | 12/1969 | Matsui et al. |
| 3,640,967 A | 2/1972 | König et al. |
| 4,040,992 A | 8/1977 | Bechara et al. |
| 4,108,814 A | 8/1978 | Reiff et al. |
| 4,260,532 A | 4/1981 | Reuther et al. |
| 4,265,798 A | 5/1981 | Mishra |
| 4,288,586 A | 9/1981 | Bock et al. |
| 4,324,879 A | 4/1982 | Bock et al. |
| 4,379,905 A | 4/1983 | Stemmler et al. |
| 4,419,513 A | 12/1983 | Breidenbach et al. |
| 4,487,928 A | 12/1984 | Richter et al. |
| 4,499,253 A | 2/1985 | Kerimis et al. |
| 4,540,633 A | 9/1985 | Kucera et al. |
| 4,604,418 A | 8/1986 | Shindo et al. |
| 4,663,377 A | 5/1987 | Hombach et al. |
| 4,789,705 A | 12/1988 | Kase et al. |
| 4,808,691 A | 2/1989 | Konig et al. |
| 4,960,848 A | 10/1990 | Scholl et al. |
| 5,013,838 A | 5/1991 | Scholl |
| 5,191,012 A | 3/1993 | Markusch et al. |
| 5,250,610 A | 10/1993 | Hänsel et al. |
| 5,252,696 A | 10/1993 | Laas et al. |
| 5,334,637 A | 8/1994 | Zwiener et al. |
| 5,489,663 A | 2/1996 | Brandt et al. |
| 5,608,000 A | 3/1997 | Duan et al. |
| 5,914,383 A | 6/1999 | Richter et al. |
| 6,107,484 A | 8/2000 | Richter et al. |
| 6,426,414 B1 | 7/2002 | Laas et al. |
| 6,767,958 B2 | 7/2004 | Laas et al. |
| 7,001,973 B2 | 2/2006 | Kohlstruk et al. |
| 7,091,341 B2 | 8/2006 | Revelant et al. |
| 7,553,902 B2 | 6/2009 | Haeberle et al. |
| 7,732,498 B2 | 6/2010 | Gurtler et al. |
| 7,971,491 B2 | 7/2011 | Greszczuk |
| 8,119,799 B2 | 2/2012 | Binder et al. |
| 8,679,112 B2 | 3/2014 | Geitz et al. |
| 8,742,166 B2 | 6/2014 | Lucas et al. |
| 9,300,842 B1 | 3/2016 | Schweid |
| 9,850,338 B2 | 12/2017 | Richter |
| 9,926,402 B2 | 3/2018 | Laas et al. |
| 2005/0137375 A1 | 6/2005 | Hansen et al. |

(Continued)

FOREIGN PATENT DOCUMENTS

| | | |
|---|---|---|
| DE | 1570540 A1 | 3/1970 |
| DE | 2446440 A1 | 4/1976 |

(Continued)

OTHER PUBLICATIONS

Justus Liebigs Annalen der Chemie vol. 562 (1949) p. 75-136.
Ullmanns Encyclopädie der technischen Chemie [Ullmann's Encyclopedia of Industrial Chemistry], 4th edition, vol. 19, Verlag Chemie, Weinheim pp. 31-38.
Progress in Organic Coatings vol. 40, Issues 1-4, Dec. 2000, pp. 99-109 Recent developments in aqueous two-component polyurethane (2K-PUR) coatings, Martin Melchiors, Michael Sonntag, Claus Kobusch, Eberhard Jürgens.

(Continued)

*Primary Examiner* — John M Cooney
(74) *Attorney, Agent, or Firm* — Jed C. Benson

(57) ABSTRACT

The present invention relates to the use of hydrophilized polyisocyanates for the production of water-diluted coating compositions which have a polymeric polyol content of not more than 10%.

15 Claims, No Drawings

(56) References Cited

U.S. PATENT DOCUMENTS

| | | | |
|---|---|---|---|
| 2006/0155095 A1 | 7/2006 | Daussin et al. | |
| 2006/0216525 A1* | 9/2006 | Huybrechts | C08G 18/6254 |
| | | | 428/423.1 |
| 2007/0203288 A1* | 8/2007 | Dorr | C08G 18/706 |
| | | | 524/589 |
| 2007/0259984 A1* | 11/2007 | Dorr | C08G 18/3206 |
| | | | 521/172 |
| 2008/0182946 A1 | 7/2008 | Dorr et al. | |
| 2013/0041102 A1* | 2/2013 | Albrecht | C08L 75/04 |
| | | | 524/590 |
| 2015/0232609 A1* | 8/2015 | Spyrou | C08G 18/7887 |
| | | | 524/591 |
| 2018/0105722 A1 | 4/2018 | Tillack et al. | |

FOREIGN PATENT DOCUMENTS

| | | |
|---|---|---|
| DE | 3240613 A1 | 5/1984 |
| EP | 0013880 A1 | 8/1980 |
| EP | 0100129 A1 | 2/1984 |
| EP | 0443167 A1 | 8/1991 |
| EP | 0671426 A1 | 9/1995 |
| EP | 0896009 A1 | 2/1999 |
| EP | 0916647 A2 | 5/1999 |
| EP | 3381962 A1 | 10/2018 |
| GB | 809809 A | 3/1959 |
| GB | 1386399 A | 3/1975 |
| GB | 1391066 A | 4/1975 |
| GB | 2221465 A | 2/1990 |
| GB | 2222161 A | 2/1990 |

OTHER PUBLICATIONS

D. Dieterich Prog. Org. Coat., 9 (1981), p. 281.
W. Kubitza, Farbe Lack, 97 (1991), pp. 201-206.
European Polymer Journal, vol. 16, 147-148 (1979).
J. H. Saunders and K. C. Frisch, Polyurethanes Chemistry and Technology, p. 94 ff. (1962).
Blank et al. in Progress in Organic Coatings, 1999, vol. 35, pp. 19-29.
J. Organomet. Chem. 2009 694 3184-3189.
Chem. Heterocycl. Comp. 2007 43 813-834.
Indian J. Chem. 1967, 5, 643-645.
International Search Report, PCT/EP2018/084941, dated Mar. 20, 2019, Authorized officer: Martin Sütterlin.

* cited by examiner

FROST-RESISTANT ADHESIVES BASED ON POLYISOCYANATES

CROSS-REFERENCE TO RELATED APPLICATION

This application is a national stage application under 35 U.S.C. § 371 of PCT/EP2018/084941, filed Dec. 14, 2018, which claims the benefit of European Application No. 17209387, filed Dec. 21, 2017, each of which is incorporated herein by reference.

FIELD

The present invention relates to the use of hydrophilized polyisocyanates for production of water-thinned adhesives.

BACKGROUND

Aqueous adhesives are a specialty in the field of water-based adhesive formulations and are used for a multitude of applications in the field of wood bonding, floor bonding, textile bonding, extending as far as automotive laminating applications, film lamination and footwear adhesives. Isocyanate-based two-component systems preferably contain rapidly drying polymers of high molecular weight with isocyanate-reactive groups in emulsified or dispersed form. Said polymers are crosslinked by means of hydrophilized isocyanates added shortly before application as a second component after drying and film formation to form urethane and urea groups. In this regard, see also: U.S. Pat. Nos. 5,608,000, 4,108,814, 4,540,633, 5,250,610, WO 20161/62394 A1, US 2005/0137375 A1.

It is true of all aqueous polymer dispersions that they are stable as an adhesive formulation only within a very limited temperature range. Both at low and high temperatures, aqueous adhesive formulations have a tendency to coagulate. This is explicable by the use of water as "thinner" and the complex stabilization of polymers as dispersions/emulsions in water via hydrophilic and/or hydrophobic, ionic and/or nonionic interactions. The methods of stabilization of organic macromolecules in water are known to the person skilled in the art and described in detail, for example, in R. G. Gilbert "Emulsion polymerization, a mechanistic approach", Academic Press, London, 1995; Poehlein, G W., Vol. 6: 1 "Dispersionen and Emulsionen, Eine Einfiihrung in die Kolloidik feinverteilter Stoffe einschlielBlich der Ton-minerale" [Dispersions and Emulsions, an Introduction into the Colloid Science of Finely Divided Substances Including the Clay Minerals], Encyclopedia of Polymer Science and Engineering, 2nd Ed., Mark, H F, et al., Eds. 1986; Lagaly, Gerhard, Schulz, Oliver, Zimehl, Ralf, Rosen, M, Surfactants and Interfacial Phenomena, John Wiley, 1989; Milton J. Rosen, Joy T., Kunjappu, Surfactants and Interfacial Phenomena, 4th Edition ISBN: 978-0-470-54194-4 March 2012.

Moreover, the solids content of water-based two-component adhesives, for practical reasons, is in most cases typically limited to not more than 60% by weight, since, above 60% by weight, viscosity rises significantly and there is a disproportionate decrease in mechanical and colloidal stability of aqueous polymer dispersions. Moreover, typical polymer dispersions that are suitable for use as adhesives (film formers) show relatively low shear stability and transport stability, such that, before they are used in application, particularly as a 2K adhesive in combination with hydrophilized isocyanates, coarse coagulate/drying residues frequently still have to be removed by filter processes.

On the other hand, conventional solvent-based two-component adhesives with isocyanate, by comparison with aqueous adhesives, are composed of isocyanate-reactive compounds of comparatively low molecular weight (resins) and polyisocyanates (for example aliphatic isocyanate-functional allophanates, isocyanurates, biurets, urethanes). The viscosity of the resins used, which is still high, is typically thinned by solvents. Commonly used solids concentrations of such solvent-based 2K adhesives are 20-80% by weight. A further problem with these 2K adhesives is their comparatively short pot life (time until doubling of the viscosity of the formulation after the mixing of the reactive components) through reaction of the isocyanates with the isocyanate-reactive compounds. Owing to the climatic potential of the solvents used and their hazard potential to the health of the user, for example through high combustibility, the use of solvent-based adhesives is attracting ever greater criticism. However, these solvent-based adhesive formulations have excellent storage stability, thermal stability and transport stability before blending of the reactive components A (isocyanate phase) and B (isocyanate-reactive phase).

An approach to production of water-thinned polyisocyanate compositions is described in U.S. Pat. No. 5,191,012. A hydrophilized polyisocyanate is dissolved here in water together with small proportions of a polyamine. The polyamine reacts with portions of the polyisocyanate to give a polyurea that encapsulates the remaining unreacted polyisocyanate and hence separates it from the water phase. This achieves long-term storage stability of the water-dispersed polyisocyanate.

A further advantage of solvent-based 2K adhesive formulations is that, owing to their low hydrophilicity, they are of particularly good suitability for enabling bonds resistant to water and water vapor even in swelling substrates such as wood. This category is generally referred to as D4 and tested according to DIN EN 204. A particular variant thereof is that of water-resistant, weathering-resistant and thermally stable 2K adhesive formulations for construction, an adhesive class which is not currently covered by polyurethane-based aqueous adhesives.

SUMMARY

It was thus an object of the present invention to develop low-viscosity and low-solvent, storage-stable, thermally stable and transport-stable (shear-stable) isocyanate-based adhesive formulations that combine the advantages of the stability of solvent-based adhesives with the positive environmental aspects of water-based adhesives. This object is achieved by the embodiments disclosed in the claims and in the description below.

It has been found that, surprisingly, it is possible to obtain isocyanate-based adhesives with excellent processing properties and product properties based on hydrophilic polyisocyanates. The viscosity of these adhesives is reduced to such an extent by the addition of water that processing is efficiently possible. If required, isocyanate-reactive compounds that are soluble in water and/or readily dispersible in water may be added to such an adhesive.

DETAILED DESCRIPTION

In a first embodiment, the present invention relates to an adhesive composition comprising a water-thinned isocyanate component A containing at least one hydrophilized polyisocyanate, the isocyanate groups of which are in direct contact with water, wherein the adhesive composition has a content of polymeric polyols of not more than 10% by weight.

In an embodiment in which no isocyanate-reactive component B is added, the molar ratio of isocyanate groups to isocyanate-reactive groups is between 0.5 and 20.0, preferably between 1.1 and 20.0, more preferably between 1.1 and 10.0 and most preferably between 1.1 and 3.0. In embodiments in which an isocyanate-reactive component B as defined further down in this application is present, the molar ratio of isocyanate groups to isocyanate-reactive groups is between 0.5 and 10.0, preferably between 0.5 and 3.0 and more preferably between 0.7 and 3.0. "Isocyanate-reactive groups" in this application are understood to mean hydroxyl, thiol and amino groups.

In a preferred embodiment, the adhesive composition of the invention has an isocyanurate content after curing of at least 50% by weight, based on solids content.

In a further preferred embodiment, the adhesive composition after curing has a glass transition point of at least 80° C.

The term "isocyanate component A" refers to the entirety of all compounds containing at least one isocyanate group that are present in the composition of the invention. Since the isocyanate component A is intended to bring about crosslinking in accordance with the invention, it preferably consists predominantly of monomeric and/or oligomeric polyisocyanates as defined below.

In one embodiment of the invention, the polyisocyanate component A contains a total of not more than 30% by weight, especially not more than 20% by weight, not more than 15% by weight, not more than 10% by weight, not more than 5% by weight or not more than 1% by weight, based in each case on its total weight, of aromatic polyisocyanates. As used here, "aromatic polyisocyanate" means a polyisocyanate having at least one aromatically bonded isocyanate group. Aromatically bonded isocyanate groups are understood to mean isocyanate groups bonded to an aromatic hydrocarbyl radical.

In a preferred embodiment of the invention, the polyisocyanate component A contains only those polyisocyanates having exclusively aliphatically and/or cycloaliphatically bonded isocyanate groups. Aliphatically and cycloaliphatically bonded isocyanate groups are respectively understood to mean isocyanate groups bonded to an aliphatic and cycloaliphatic hydrocarbyl radical.

The isocyanate component A has an isocyanate concentration between 2% by weight and 40% by weight, preferably between 5% by weight and 30% by weight, preferably between 8% by weight and 25% by weight. The isocyanate concentration is calculated here as the proportion by weight of the isocyanate group NCO in the overall molecule. The isocyanate concentration is commonly determined via isocyanate titration.

In a preferred embodiment, the composition contains an isocyanate concentration between 2% by weight and 40% by weight, preferably between 5% by weight and 30% by weight, preferably between 8% by weight and 25% by weight. The isocyanate concentration is based here on the solids content of the coating composition. The solids content is defined as the content of nonvolatile constituents of the coating composition. The isocyanate concentration is commonly determined via isocyanate titration.

"Direct contact of isocyanate groups with water" means that there is no spatial separation between the isocyanate groups and the water phase in the ready-to-use adhesive composition. More particularly, there is no solid phase that separates the isocyanate from the water phase. In a system known from the prior art, a small proportion of the isocyanate groups of the polyisocyanate is converted by reaction with a polyamine to a polyurea that encapsulates the unreacted proportions of the polyisocyanate and hence forms a solid phase. Said solid phase separates the remaining polyisocyanate from the water phase. In the adhesive composition of the invention, by contrast, the polyisocyanate component A is not in encapsulated form in the ready-to-use adhesive composition. It cannot be ruled out that a small proportion of the isocyanate groups in the polyisocyanate component A reacts with water. It will be clear here to the person skilled in the art that only a small proportion of the isocyanate group at the interface of the isocyanate particles is in true contact with water. In the case of hydrophilized isocyanates, the dispersion of isocyanates in water is once again additionally stabilized by ionic or steric means. The trend is that the particle size is lowered in the process; the particle size of hydrophilized water-dispersed isocyanates typically has smaller particles or a larger water contact phase than non-hydrophilized isocyanates.

"Ready-to-use" means here that the adhesive composition can be applied to a surface and cured there without further preparation, especially without further prior reaction of its constituents with one another.

In the embodiments of the present invention that envisage the reaction of the polyisocyanate component A with isocyanate-reactive compounds, especially the water-soluble polyols defined below, these isocyanate-reactive compounds are preferably mixed with the water-thinned polyisocyanate composition A not more than 8 hours, preferably not more than 4 hours and more preferably not more than 1 hour prior to the application to the surface. In each case, however, the mixing is effected at least 30 minutes prior to the application to the surface.

Polyisocyanate

Where reference is made here to "polyisocyanates" in general terms, this means monomeric and/or oligomeric polyisocyanates alike. For the understanding of many aspects of the invention, however, it is important to distinguish between monomeric diisocyanates and oligomeric polyisocyanates. Where reference is made here to "oligomeric polyisocyanates", this means polyisocyanates formed from at least two monomeric diisocyanate molecules, i.e. compounds that constitute or contain a reaction product formed from at least two monomeric diisocyanate molecules.

The hydrophilized polyisocyanates may in principle be monomeric or oligomeric polyisocyanates. If the hydrophilized polyisocyanate is a monomeric polyisocyanate, all diisocyanates described hereinafter for the formation of oligomeric polyisocyanates are also suitable for use as monomeric polyisocyanate. However, hydrophilized polyisocyanates used with preference are those compounds that are obtained by modification of the oligomeric polyisocyanates described hereinafter. There follows a description of the base structures of such oligomeric polyisocyanates that can be converted to the hydrophilized polyisocyanates of the invention by the reaction with hydrophilizing groups.

The production of oligomeric polyisocyanates from monomeric diisocyanates is also referred to here as oligomerization of monomeric diisocyanates. This "oligomerization" as used here means the reaction of monomeric diisocyanates to give oligomeric polyisocyanates having uretdione, isocyanurate, allophanate, biuret, iminooxadiazinedione and/or oxadiazinetrione structure.

For example, hexamethylene diisocyanate (HDI) is a "monomeric diisocyanate" since it contains two isocyanate groups and is not a reaction product of at least two polyisocyanate molecules:

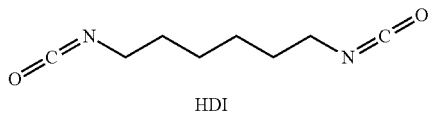

HDI

By contrast, reaction products of at least two HDI molecules which still have at least two isocyanate groups are "oligomeric polyisocyanates" in the context of the invention. Proceeding from monomeric HDI, representatives of such "oligomeric polyisocyanates" include for example the HDI isocyanurate and the HDI biuret each constructed from three monomeric HDI units:

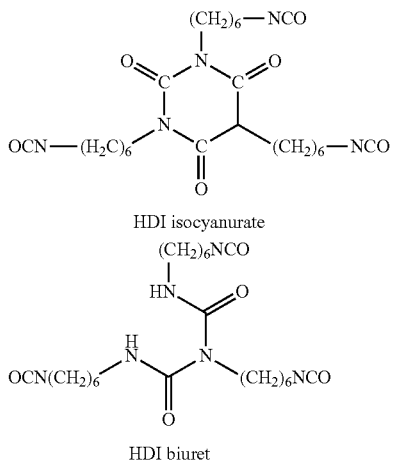

According to the invention, for the production of the adhesive compositions of the invention comprising hydrophilized polyisocyanates, low-monomer polyisocyanates are used (i.e. low in monomeric diisocyanates). In one embodiment of the invention, the hydrophilized polyisocyanate used consists entirely or to an extent of at least 80%, 85%, 90%, 95%, 98%, 99% or 99.5% by weight, based in each case on the weight of the total amount of hydrophilized isocyanates, of oligomeric polyisocyanates.

The presence of oligomeric polyisocyanates envisaged in accordance with the invention and the contents specified therefor relate to the composition originally provided, i.e. prior to commencement of the catalytic urethanization and/or trimerization, meaning that they are not, for instance, formed as intermediates during the process; instead, the oligomeric polyisocyanates are already present as reactant on commencement of the reaction in the adhesive composition of the invention.

"Low in monomers" and "low in monomeric diisocyanates" is used here in relation to the composition of the hydrophilized isocyanates.

Results of particular practical relevance are established when the isocyanate component A has a proportion of monomeric diisocyanates of not more than 20% by weight, especially not more than 15% by weight or not more than 10% by weight, or not more than 5% by weight, based in each case on the weight of the adhesive composition.

Preferably, the isocyanate component A has a content of monomeric diisocyanates of not more than 2% by weight, preferably not more than 1% by weight, more preferably not more than 0.5% by weight, based in each case on the weight of the adhesive composition. What is meant in this connection by "practically relevant" is also that a small amount of monomeric isocyanates permits simpler and safer handling of the adhesive compositions of the invention. But a hydrophilized monomeric isocyanate in this connection is not covered by the category of monomeric isocyanates according to the invention.

Results of particular practical relevance are established when the adhesive composition is essentially free of monomeric diisocyanates. Compositions or formulations having a diisocyanate content of $\leq 0.1\%$ are referred to here as being free of monomeric diisocyanates.

It is particularly preferred that the isocyanate component A has a low monomer level. In practice, this can especially be achieved in that, in the preparation of the oligomeric polyisocyanate, the actual oligomerization reaction is followed in each case by at least one further method step for removal of the unconverted excess monomeric modified diisocyanates. This removal of monomers can be effected in a manner of particular practical relevance by methods known per se, preferably by thin-film distillation under high vacuum or by extraction with suitable solvents that are inert toward isocyanate groups, for example aliphatic or cycloaliphatic hydrocarbons such as pentane, hexane, heptane, cyclopentane or cyclohexane.

The oligomeric polyisocyanates are typically obtained by oligomerization of simple aliphatic, cycloaliphatic, araliphatic and/or aromatic monomeric diisocyanates or mixtures of such monomeric diisocyanates.

According to the invention the oligomeric polyisocyanates may in particular have uretdione, isocyanurate, allophanate, biuret, iminooxadiazinedione and/or oxadiazinetrione structure. In one embodiment of the invention, the oligomeric polyisocyanates have at least one of the following oligomeric structure types or mixtures thereof:

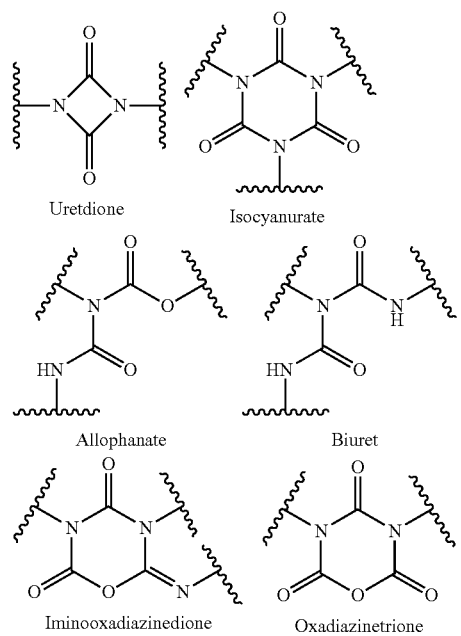

Uretdione  Isocyanurate

Allophanate  Biuret

Iminooxadiazinedione  Oxadiazinetrione

In a particularly preferred embodiment of the invention, the oligomeric polyisocyanates contain at least one structure selected from the group consisting of allophanate, uretdione, isocyanurate, biuret, iminooxadiazinedione and oxadiazinetrione.

It has been found that, surprisingly, it can be advantageous to use oligomeric polyisocyanates that are a mixture of at least two oligomeric polyisocyanates, wherein the at least two oligomeric polyisocyanates differ in terms of their structure. The oligomeric structure of the oligomeric polyisocyanates is preferably selected from the group consisting of allophanate, uretdione, isocyanurate, allophanate, biuret, iminooxadiazinedione and oxadiazinetrione structure and mixtures thereof. Starting mixtures of this kind can especially lead, by comparison with oligomeric polyisocyanates of just one defined structure, to an effect on the Tg value, which is advantageous for many applications.

In another embodiment, the oligomeric isocyanates are those containing oligomeric polyisocyanates of just a single defined oligomeric structure, for example exclusively or for the most part isocyanurate structure. Thus, preference is given to using oligomeric polyisocyanates of a single defined oligomeric structure, the oligomeric structure being selected from the group consisting of uretdione, isocyanurate, allophanate, biuret, iminooxadiazinedione and oxadiazinetrione structures. However, for preparation-related reasons, the composition generally always includes oligomeric polyisocyanates of multiple different oligomeric structures together.

Consequently, the polyisocyanates of the invention, in a further embodiment, are those which have mainly an isocyanurate structure and which may contain the abovementioned uretdione, allophanate, biuret, iminooxadiazinedione and/or oxadiazinetrione structures only as by-products.

It is likewise possible in accordance with the invention to use oligomeric polyisocyanates having very substantially no isocyanurate structure, and containing mainly at least one of the abovementioned uretdione, allophanate, biuret, iminooxadiazinedione and/or oxadiazinetrione structure types. In a particular embodiment of the invention, the hydrophilically modified isocyanates contain a structure type selected from the group consisting of uretdione, allophanate, biuret, iminooxadiazinedione and oxadiazinetrione structures.

An oligomeric polyisocyanate has mainly one of the above-defined structures when this structure accounts for at least 50 mol % of the sum total of all uretdione, isocyanurate, allophanate, biuret, iminooxadiazinedione and oxadiazinetrione structures.

The uretdione, isocyanurate, allophanate, biuret, iminooxadiazinedione and/or oxadiazinetrione structure in the oligomeric, hydrophilically modified polyisocyanates and their precursor of oligomeric polyisocyanates can be determined, for example, by NMR spectroscopy. It is possible here with preference to use $^{13}$C NMR spectroscopy, preferably in proton-decoupled form, since the oligomeric structures mentioned give characteristic signals.

Irrespective of the underlying oligomeric structure type (uretdione, isocyanurate, allophanate, biuret, iminooxadiazinedione and/or oxadiazinetrione structure), the oligomeric polyisocyanates used in accordance with the invention for production of the hydrophilically modified oligomeric polyisocyanates preferably have an (average) NCO functionality of 1.0 to 8.0, preferably of 1.5 to 6, more preferably 2.0 to 4.0.

Suitable monomeric polyisocyanates for producing the oligomeric polyisocyanates are any desired polyisocyanates obtainable in various ways, for example by phosgenation in the liquid or gas phase or by a phosgene-free route, for example by thermal urethane cleavage. Particularly good results are established when the polyisocyanates are monomeric diisocyanates. Preferred monomeric diisocyanates are those having a molecular weight in the range from 140 to 400 g/mol, having aliphatically, cycloaliphatically, araliphatically and/or aromatically bonded isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates. Further diisocyanates which are likewise suitable may additionally be found, for example, in *Justus Liebigs Annalen der Chemie Volume* 562 (1949) p. 75-136.

In addition, it is also possible according to the invention to use conventional prepolymers bearing aliphatic or aromatic isocyanate end groups, for example polyether, polyester, polyacrylate, polyepoxide or polycarbonate prepolymers bearing aliphatic or aromatic isocyanate end groups, as mono- and polyisocyanates.

Hydrophilized Isocyanate

A "hydrophilized" polyisocyanate in the context of the present invention is a monomeric or oligomeric polyisocyanate that has been hydrophilized by an external and/or internal emulsifier to such an extent that, after mixing with water, there is no formation of separate continuous phases nor formation of a dispersion having an average particle size of more than 5 μm.

An "external emulsifier" is not covalently bonded to the polyisocyanate. It features at least one hydrophilic moiety and at least one hydrophobic moiety. The hydrophilic moiety is directed outward and stabilizes the comparatively hydrophobic isocyanates in water as dispersions. The hydrophobic moiety is directed inward and is preferably miscible with the isocyanate phase. It is a feature of the external emulsifier that it does not react with the isocyanate. Suitable external emulsifiers are described below.

An "internal emulsifier" is a molecule having at least one hydrophilizing group and preferably also at least one functional group reactive with isocyanate groups which is covalently bonded to the polyisocyanate by reaction with the polyisocyanate and promotes the formation of dispersions of the polyisocyanate in water. If the resultant dispersions have an average particle diameter of less than 50 nm, they are frequently described as solutions in water since they have a visually clear appearance. Conversely, hydrophilized isocyanates can dissolve or very finely disperse water in small amounts.

The reaction in which an internal emulsifier is covalently bonded to the polyisocyanate is also referred to hereinafter as "modification" of a polyisocyanate. The internal emulsifier is also referred to hereinafter as "functionalizing reagent". The functional group reactive with isocyanate groups mediates the bonding to the polyisocyanate. Suitable isocyanate-reactive functional groups are especially hydroxyl, amino and thiol groups.

The hydrophilizing group of a functionalizing reagent may be an ionically hydrophilizing group or a nonionically hydrophilizing group. According to the invention, the functionalizing reagent is more strongly hydrophilic overall than the polyisocyanate that is to be hydrophilically modified thereby.

Ionically hydrophilizing groups are preferably sulfonium groups, ammonium groups, phosphonium groups, carboxylate groups, sulfonate groups, phosphonate groups, or groups that can be converted to the aforementioned groups by salt formation (potentially ionic groups). Preferred ionic or potentially ionic compounds which can be used as hydrophilic functionalizing reagent are mono- and dihydroxycarboxylic acids, mono- and diaminocarboxylic acids, mono- and dihydroxysulfonic acids, mono- and diaminosulfonic acids and mono- and dihydroxyphosphonic acids or mono- and diaminophosphonic acids and salts thereof, such as dimethylolpropionic acid, dimethylolbutyric acid, hydroxypivalic acid, N-(2-aminoethyl)-β-alanine, 2-(2-aminoethylamino)ethanesulfonic acid, propylene-1,2- or -1,3-diamine-β-ethylsulfonic acid, ethylenediaminepropyl- or -butylsulfonic acid, malic acid, citric acid, glycolic acid, lactic acid, glycine, alanine, taurine, lysine, 3,5-diaminobenzoic acid, an addition product of IPDI and acrylic acid (EP-A 0 916 647, Example 1) and the alkali metal and/or ammonium salts thereof; the adduct of sodium bisulfite onto but-2-ene-1,4-diol, polyethersulfonate, the propoxylated adduct of 2-butenediol and NaHSO$_3$, described, for example, in DE-A 2 446 440 (pages 5-9, formulae and units that can be converted to cationic groups, such as N-methyldiethanolamine, as hydrophilic formation components. The hydrophilic functionalizing reagent is most preferably selected from the sodium salts of N-(2-aminoethyl)-β-alanine or 2-(2-aminoethylamino)ethanesulfonic acid or from dimethylpropionic acid. In an advantageous embodiment of the invention, both sodium salts of N-(2-aminoethyl)-β-alanine or 2-(2-aminoethylamino)ethanesulfonic acid and dimethylpropionic acid are used as functionalizing reagent.

Nonionically hydrophilizing groups are those functional groups that, even without formation of an ion, are more hydrophilic than the polyisocyanate to be modified. Preferred nonionically hydrophilizing groups are alcohols, amines, acids and derivatives thereof, epoxides, and in particular polyols such as sugars, polyacrylate polyols, polyester polyols, polyether polyols, polyvinyl alcohols, polycarbonate polyols, polyether carbonate polyols and polyester carbonate polyols, polyamines, OH-functional polyvinylpyrrolidones, polyoxymethylene polyols, polyaldol polyols.

The polyols suitable in accordance with the invention as functionalizing reagent preferably have an OH functionality of ≥1 to ≤6. Preference is given to polyols having a number-average molecular weight of ≥100 g/mol to ≤10 000 g/mol and an OH functionality of ≥1 to ≤3, more preferably ≥1 and ≤2. The number-average molecular weight can be determined in accordance with DIN 55672-1 by gel permeation chromatography (GPC) in tetrahydrofuran (THF) at 23° C.

The polycarbonates having hydroxyl groups that are to be used as functionalizing reagent for preparation of the hydrophilically oligomeric, modified polyisocyanates are obtainable by reaction of carbonic acid derivatives, for example diphenyl carbonate, dimethyl carbonate or phosgene, with diols. Useful diols of this kind include, for example, ethylene glycol, propane-1,2- and -1,3-diol, butane-1,3- and -1,4-diol, hexane-1,6-diol, octane-1,8-diol, neopentyl glycol, 1,4-bishydroxymethylcyclohexane, 2-methylpropane-1,3-diol, 2,2,4-trimethylpentane-1,3-diol, dipropylene glycol, polypropylene glycols, dibutylene glycol, polybutylene glycols, bisphenol A, tetrabromobisphenol A, but also lactone-modified diols. Preferably, the diol component contains ≥40% by weight to ≤100% by weight of hexanediol, preferably hexane-1,6-diol and/or hexanediol derivatives, especially those having ether or ester groups as well as terminal OH groups. Examples include products which have been obtained by reaction of 1 mol of hexanediol with at least 1 mol, preferably 1 to 2 mol, of caprolactone according to DE-A 1 770 245, or by etherification of hexanediol with itself to give di- or trihexylene glycol. The preparation of such derivatives is known, for example, from DE-A 1 570 540. The polyether polycarbonate diols described in DE-A 3 717 060 can also be used in accordance with the invention as functionalizing reagent.

The hydroxyl polycarbonates usable in accordance with the invention as hydrophilic functionalizing reagent should preferably be linear. However, they may optionally be lightly branched by the incorporation of polyfunctional components, especially low molecular weight polyols. Suitable examples for this purpose are glycerol, trimethylolpropane, hexane-1,2,6-triol, butane-1,2,4-triol, trimethylolpropane, pentaerythritol, chinit, mannitol and sorbitol, methyl glycoside, 1,3,4,6-dianhydrohexitols.

Polyether polyols likewise usable in accordance with the invention as hydrophilic functionalizing reagent are polytetramethylene glycol polyethers which can be prepared, for example, via polymerization of tetrahydrofuran by cationic ring opening.

In addition, polyether polyols of the invention that are suitable as hydrophilic functionalizing reagent are the polyaddition products, prepared using starter molecules, of ethylene oxide, propylene oxide, butylene oxide, styrene oxide or epichlorohydrin, and the mixed and graft polyaddition products thereof, and the polyethers obtained by condensation of polyhydric alcohols or mixtures thereof and those obtained by alkoxylation of water, polyhydric alcohols, amines or amino alcohols.

In a preferred embodiment, in accordance with the invention, homo- and/or copolyaddition compounds of ethylene oxide and/or propylene oxide are used.

Polyester polyols suitable for use as hydrophilic functionalizing reagent for preparation of the oligomeric, modified polyisocyanates are, for example, the known per se polycondensates of di- and optionally tri- and tetraols, and di- and optionally tri- and tetracarboxylic acids or hydroxycarboxylic acids or lactones. Instead of the free polycarboxylic acids, it is also possible to use the corresponding polycarboxylic anhydrides or corresponding polycarboxylic esters of lower alcohols to prepare the polyesters. Examples of diols suitable for the purpose are ethylene glycol, butylene glycol, diethylene glycol, triethylene glycol, polyalkylene glycols such as polyethylene glycol, and also propane-1,2-diol, propane-1,3-diol, butanediol(1,3), butanediol(1,4), hexanediol(1,6) and isomers, neopentyl glycol or neopentyl glycol hydroxypivalate. In addition, it is also possible to use polyols such as trimethylolpropane, glycerol, erythritol, pentaerythritol, trimethylolbenzene or trishydroxyethyl isocyanurate. Suitable dicarboxylic acids in this context are, for example, phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid and/or 2,2-dimethylsuccinic acid. It is also possible to use the corresponding anhydrides as the acid source. If the average functionality of the polyol to be esterified is greater than 2, it is additionally also possible to use monocarboxylic acids such as benzoic acid and hexanecarboxylic acid as well. Examples of hydroxycarboxylic acids that may be used as co-reactants in the preparation of a polyester polyol having terminal hydroxyl groups include hydroxycaproic acid, hydroxybutyric acid, hydroxydecanoic acid, hydroxystearic acid and the like. Suitable lactones are caprolactone, butyrolactone and homologs. Preference is given to caprolactone.

In a preferred embodiment of the invention, polyester polyols based on adipic acid and ethylene glycol, butane-1,4-diol, neopentyl glycol and/or hexane-1,6-diol are used as functionalizing reagent.

For this purpose, monofunctional alcohols and monoamines are useful as hydrophilic functionalizing reagent. Preferred monoalcohols are aliphatic monoalcohols having 1 to 18 carbon atoms, for example ethanol, n-butanol, ethylene glycol monobutyl ether, 2-ethylhexanol, 1-octanol, 1-dodecanol or 1-hexadecanol. Preferred monoamines are aliphatic monoamines, for example diethylamine, dibutylamine, ethanolamine, N-methylethanolamine or N,N-diethanolamine, and amines from the Jeffamine® M series (Huntsman Corp. Europe, Belgium) or amino-functional polyethylene oxides and polypropylene oxides.

Likewise suitable as hydrophilic functionalizing reagent are polyols, amino polyols or polyamines having a molar mass below 400 g/mol.

Nonionic hydrophilic compounds suitable as hydrophilic functionalizing reagent are, for example, polyoxyalkylene ethers containing at least one hydroxyl or amino group. These polyethers contain a proportion of 30% by weight to 100% by weight of ethylene oxide units. Useful compounds include polyethers of linear construction having a functionality between 1 and 3, but also compounds of the general formula (III)

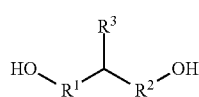

(III)

Functionalizing reagents suitable for preparation of the hydrophilic polyisocyanates usable in accordance with the invention preferably have a surface tension of >20 mN/m and <90 mN/m. in which $R^1$ and $R^2$ are each independently a divalent aliphatic, cycloaliphatic or aromatic radical which has 1 to 18 carbon atoms and may be interrupted by oxygen and/or nitrogen atoms, and $R^3$ is an alkoxy-terminated polyethylene oxide radical.

Further hydrophilic nonionic compounds suitable as functionalizing reagent are polyether alcohols, especially polyalkylene oxide polyether alcohols, preferably mono- or polyhydric polyalkylene oxide polyether alcohols having a statistical average of 5 to 50 ethylene oxide units per molecule, as obtainable in a manner known per se by alkoxylation of suitable starter molecules (for example see Ullmanns Encyclopadie der technischen Chemie [Ullmann's Encyclopedia of Industrial Chemistry], 4th edition, volume 19, Verlag Chemie, Weinheim pp. 31-38). Starter molecules of this kind may be, for example, any mono- or polyhydric alcohols from the molecular weight range of 32 to 300, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols, hydroxymethylcyclohexane, 3-methyl-3-hydroxymethyloxetane, benzyl alcohol, phenol, the isomeric cresols, octylphenols, nonylphenols and naphthols, furfuryl alcohol, tetrahydrofurfuryl alcohol, ethane-1,2-diol, propane-1,2- and -1,3-diol, the isomeric butanediols, pentanediols, hexanediols, heptanediols and octanediols, cyclohexane-1,2- and -1,4-diol, cyclohexane-1,4-dimethanol, 4,4'-(1-methylethylidene)biscyclohexanol, propane-1,2,3-triol, 1,1,1-trimethylolethane, hexane-1,2,6-triol, 1,1,1-trimethylolpropane, 2,2-bis(hydroxymethyl)propane-1,3-diol or 1,3,5-tris(2-hydroxyethyl) isocyanurate.

Alkylene oxides suitable for the alkoxylation reaction are especially ethylene oxide and propylene oxide, which can be used in the alkoxylation reaction in any sequence or else in a mixture. Suitable polyether alcohols are either pure polyethylene oxide polyether alcohols or mixed polyalkylene oxide polyethers, the alkylene oxide units of which consist to an extent of at least 70 mol %, preferably to an extent of at least 80 mol %, of ethylene oxide units.

In a preferred embodiment of the present invention, hydrophilized polyisocyanates used for the compositions of the invention are those that are known in principle from the prior art and are described, for example, in EP-A 0 206 059, EP-A 0 540 985, EP-A 0 959 087 and EP-A1 287 052. They have hitherto been used predominantly as crosslinker components for aqueous lacquer and adhesive compositions.

In one embodiment of the invention, the hydrophilic functionalizing reagent used for preparation of the hydrophilic polyisocyanate is a polyether alcohol.

In a preferred embodiment of the invention, the hydrophilic polyisocyanate is prepared using, as hydrophilic functionalizing reagent, a polyalkylene oxide polyether alcohol, especially one that has been prepared using the abovementioned monoalcohols from the molecular weight range of 32 to 150 as starter molecule.

In a particularly preferred embodiment of the invention, the hydrophilic functionalizing reagent used for preparation of the hydrophilic polyisocyanate is a polyether alcohol which is a pure polyethylene glycol monomethyl ether alcohol, especially one having a statistical average of 5 to 50, most preferably 5 to 25, ethylene oxide units.

The hydrophilized isocyanate preferably has a molecular weight of not more than 20 000 g/mol, preferably not more than 10 000 g/mol, preferably not more than 5000 g/mol, more preferably not more than 3000 g/mol.

Suitable hydrophilized isocyanates are described by way of example in: Progress in Organic Coatings Volume 40, Issues 1-4, December 2000, Pages 99-109 Recent developments in aqueous two-component polyurethane (2K-PUR) coatings, Martin Melchiors', Michael Sonntag, Claus Kobusch, Eberhard Jiirgens; D. Dieterich Prog. Org. Coat., 9 (1981), p. 281; W. Kubitza, Farbe Lack, 97 (1991), pp. 201-206; WO 2004022624 A1; U.S. Pat. No. 6,426,414B1, US07971491, US09300842, US08679112, DE-A-41 42 275, EP-A-206059.

Hydrophilically modified polyisocyanates are obtained by reacting a polyisocyanate with a functionalizing reagent. The ratio of the two coreactants is chosen here such that there is an excess of isocyanate groups in the polyisocyanate over the isocyanate-reactive groups of the functionalizing reagent. In this way, a hydrophilized isocyanate is obtained, wherein the molecules still contain an average of at least 1.0, more preferably at least 1.6 and most preferably at least 2.0 free isocyanate groups. The preparation of such preferred hydrophilic polyisocyanates is known in principle and described, for example, in EP-A 0 206 059 and EP-A 0 540 985.

Taking account of the average isocyanate functionality of the hydrophilized isocyanate and its proportion in the isocyanate composition A, the average functionality of all the hydrophilized and non-hydrophilized isocyanate molecules present in the isocyanate composition A is at least 1.6, preferably at least 1.8 and more preferably at least 2.0.

The preparation of the oligomeric, hydrophilically modified polyisocyanate by partial reaction of oligomeric polyisocyanates with at least one hydrophilic functionalizing reagent reactive toward isocyanate groups can be effected in the presence of catalysts known to be suitable from the prior art that promote the reaction of the functionalizing reagent with the oligomeric polyisocyanate. It has been found to be of particular practical relevance when the catalyst used is a catalyst selected from dibutyltin dilaurate, tin dioctoate and zinc bis(2-ethylhexanoate). The catalyst is preferably selected from zinc bis(2-ethylhexanoate) and catalysts which promote the formation of oxazolidinones and also isocyanurates, and mixtures thereof.

Since the reaction of polyisocyanates with isocyanate-reactive groups is a statistical process, all isocyanate groups in individual polyisocyanate molecules react with the functionalizing reagent, while there are other polyisocyanate molecules in which all isocyanate groups originally present are still present. Consequently, a polyisocyanate composition A of the invention will in practice contain not only hydrophilized polyisocyanate molecules but in most cases also unmodified polyisocyanate molecules.

In a further preferred embodiment, the hydrophilically modified isocyanates thus obtained can be thinned with unmodified polyisocyanates, such that the isocyanate component A obtainable in accordance with the invention and containing hydrophilized isocyanates as a preferred isocyanate concentration of 5% by weight to 40% by weight of isocyanate, based on the total weight of the isocyanate component A, and an average isocyanate functionality of 1.6 to 8.

In the preparation of a hydrophilized polyisocyanate suitable in accordance with the invention, the molar ratio of free isocyanate groups in the polyisocyanate to isocyanate groups in the functionalizing reagent is preferably at least 1.0:0.3, more preferably at least 1.0:0.2, even more preferably at least 1.0:0.15 and most preferably at least 1.0:0.1.

In a particular embodiment of the invention, the adhesive composition of the invention contains a proportion of hydrophilically modified isocyanate of not more than 80% by weight, especially not more than 70% by weight, not more than 60% by weight, not more than 50% by weight, not more than 40% by weight or not more than 30% by weight, based in each case on the weight of the hydrophilically modified isocyanate, based on the overall polyisocyanate component A. At the same time, the adhesive composition of the invention contains a proportion of hydrophilically modified isocyanate of at least 5% by weight, preferably at least 10% by weight, more preferably at least 15% by weight and most preferably at least 20% by weight. This embodiment is based on the fact that a proportion of the hydrophilically modified polyisocyanate of less than 100% by weight is also sufficient to disperse a hydrophilically unmodified proportion of isocyanates in water in accordance with the invention.

External emulsifiers are notable for the presence of hydrophilic and hydrophobic end groups, where these in turn preferably do not have any isocyanate reactivity. Examples of these are AB and ABA block copolymers of polyethylene oxide and polybutyl acrylate or lauryl alcohol-started polyethers. The illustrative polyethers have methyl or ethyl groups at their ends. Alternatively, it is possible to use anionic or cationic emulsifiers, for example alkylbenzenesulfonates (ABS): $C_nH_{2n+1}-C_6H_4-SO_3^-Na^+$, for example: sodium dodecylbenzenesulfonate, secondary alkylsulfonates (also alkanesulfonates, SAS): $C_nH_{2n+1}-SO_3^-Na^+$, fatty alcohol sulfates (FAS): $H_3C-(CH_2)_1-CH_2-O-SO_{31}^-Na^+$ [n=8–16], for example: sodium lauryl sulfate, alkyl ether sulfates, e.g. sodium dodecylpoly(oxyethylene)sulfate (SLES), taurides. Examples of cationic emulsifiers are based on quaternary ammonium compounds having different long-chain alkyl radicals, such as stearyl, palmityl, methyl, benzyl, butyl, with a chloride ion as counterion.

In a preferred embodiment, the isocyanate component A is a mixture of hydrophilized and non-hydrophilized isocyanates, wherein the hydrophilized isocyanates account for a proportion of at least 3% by weight, preferably at least 5% by weight and most preferably at least 10% by weight. The mixture may result from reaction of not all the polyisocyanates used with the functionalizing reagent in the hydrophilic modification of polyisocyanates. The mixture may alternatively arise from the active addition of non-hydrophilized polyisocyanates to a composition comprising or consisting of hydrophilized polyisocyanates.

In each case, the isocyanate component A obtainable in accordance with the invention, comprising hydrophilized isocyanates, has a preferred isocyanate concentration of 5% by weight to 40% by weight of isocyanate, based on the total weight of the isocyanate component A and an average isocyanate functionality of 1.6 to 8.0.

It is essential to the invention that the proportion of hydrophilized polyisocyanates in the isocyanate composition A is so large that it is possible to add sufficient water to an anhydrous isocyanate component A to lower its viscosity by at least 40%, preferably at least 60% and more preferably at least 80% compared to an otherwise identical but anhydrous isocyanate component A, without resulting, within the pot life of the composition, in formation of a dispersion having an average particle size of more than 5 µm or in formation of separate continuous phases that cannot easily be redispersed to give a solution or dispersion having an average particle size of not more than 5 µm. More preferably, after blending of the isocyanate phase A with the aqueous phase, there is no formation of separate continuous phases or of a dispersion having an average particle size of more than 5 µm before the blend is applied as an adhesive to a substrate. For use of the inventive compositions in the bonding of substrates, a simple redispersion is understood to mean dispersion by means of customary auxiliaries that are available on site, such as a simple stirrer unit such as a laboratory stirrer, a drum stirrer or a drill with an attached stirrer head and optionally even a stirrer rod.

Thinning of the Isocyanate Component A with Water

According to the invention, the isocyanate component A has been thinned with water. "Thinning" in the context of the present invention differs from the "reacting" of a polyisocyanate component in that at least 90% of the free isocyanate groups of the polyisocyanate component that were present prior to the thinning are conserved. This means that a sufficient amount of water has been added to the isocyanate component for its viscosity to be lowered compared to an otherwise identical but anhydrous isocyanate component A. According to the invention, a sufficient amount of water is added to the isocyanate component A for its viscosity to have been lowered by at least 40%, preferably at least 60% and more preferably at least 80% compared to an otherwise identical but anhydrous isocyanate component A. Concentrations of the isocyanate component A in water that are suitable for the purpose are between 5% by weight and 95% by weight, preferably between 15% by weight and 90% by weight, more preferably between 20% by weight and 85% by weight, even more preferably between 30% by weight and 70% by weight and most preferably between 30% by weight and 60% by weight. In a very particularly preferred embodiment of the present invention, the concentration of the isocyanate component A in water is 5% to 70% by weight or 80% to 95% by weight. An "anhydrous" isocyanate component A is one containing not more than 0.1% by weight of water. Since isocyanate groups react with water present over a period of days or weeks, it can be assumed that any isocyanate component A that has been taken from a vessel that has not been opened since it was filled will have the aforementioned maximum content.

If a water-soluble isocyanate-reactive component B as defined below in this application is present, it is preferable that the isocyanate component A is thinned with water by adding it to an aqueous solution of the isocyanate-reactive component B.

In a preferred embodiment of the present invention, the water-thinned isocyanate component A forms dispersions of the isocyanate in water having an average particle size of not more than 5 μm, more preferably not more than 1 μm and most preferably not more than 500 nm in diameter. Most preferably, the average particle size of the dispersion formed is not more than 200 nm; most preferably, the dispersion is visually clear. A particularly preferred embodiment concerns a solution of the hydrophilized isocyanate in water.

In a preferred embodiment, the adhesive composition of the invention has a solids content of at least 5% by weight, preferably at least 20% by weight, more preferably at least 30% by weight and especially preferably at least 40% by weight.

The water-thinned polyisocyanate component A of the invention is preferably obtained by dissolving or dispersing the polyisocyanate component A in water, and further compounds having isocyanate-reactive groups (except for water) that form a solid interface layer with the isocyanate within a period of <10 min, for example high-functionality primary amines via the formation of a solid polyurea interface layer between the water phase and the isocyanate phase, are already present in the water or are added at most in such an amount that the molar ratio of isocyanate groups to amino groups is at least 30:1. In a preferred embodiment, the present invention relates to a coating composition comprising a water-thinned polyisocyanate component A which has been thinned in the manner defined in this section.

Exclusion of Polymeric Polyols

As set out in the introduction, aqueous dispersions of polymeric polyols have the disadvantage of being stable only within a limited temperature range. Consequently, it is an advantage of the adhesive composition of the invention that it can be processed efficiently even without the use of polymeric polyols and enables the production of adhesives having good performance properties.

Consequently, the adhesive composition of the invention, based on the weight of the adhesive composition, contains at most 10% by weight, preferably at most 5% by weight, more preferably at most 2% by weight, of polymeric polyols, and most preferably <1% by weight of polymeric polyols. Most preferably, the adhesive composition is free of polymeric polyols.

"Polymeric polyol" in this application is understood to mean any compound that has an average of at least 1.2 hydroxyl groups and has a number-average molecular weight of at least 2000 g/mol, preferably at least 5000 g/mol, more preferably at least 10 000 g/mol and most preferably at least 20 000 g/mol.

Isocyanate-Reactive Component B

In a particularly preferred embodiment of the present invention, the adhesive composition of the invention contains a water-soluble isocyanate-reactive component B.

A component B is "isocyanate-reactive" when it contains at least one functional group that can react with an isocyanate group and, as a result of this reaction, the isocyanate-reactive component B can crosslink with component A comprising polyisocyanate. Preferably, component B contains an average per molecule of at least two functional groups having the reactivity described above. Preferred functional groups that satisfy this criterion are hydroxyl, thiol and amino groups.

Component B of the invention is preferably water-soluble, having a water solubility of at least 50 g/l of water, preferably at least 200 g/l of water and most preferably at least 500 g/l of water. Preference is given to those components B having aqueous solutions that have better storage stability compared to conventional aqueous dispersions of polyurethanes, polyacrylates, polyesters, polyepoxides, ethylene-vinyl acetate, alkyd resins or mixtures thereof, as typically used in 2K isocyanate-crosslinking adhesive formulations. More particularly, aqueous solutions of a component B of the invention having a proportion of component B of not more than 60% by weight, preferably not more than 50% by weight, even more preferably not more than 40% by weight, even more preferably still not more than 30% by weight and most preferably not more than 25% by weight, even after repeated cooling to −5° C. and subsequent thawing, remain stable, "stability" meaning that component B does not react with water under hydrolysis and elimination of small molecules, especially alcohols and amines, or can be redispersed/homogenized/dissolved again after freezing by stirring the mixture up.

The water-soluble isocyanate-reactive component B has a number-average molecular weight of not more than 1800 g/mol, preferably 1200 g/mol, more preferably not more than 800 g/mol and even more preferably not more than 600 g/mol.

Preferred isocyanate-reactive components B are water-soluble or readily water-dispersible isocyanate-reactive constituents, preferably selected from the group consisting of alcohols, amines and thiols. Particular preference is given to methanol, ethanol, n-propanol, isopropanol, n-butanol, isobutanol, sec-butanol, the isomeric pentanols, hexanols, octanols and nonanols, cyclohexanol, ethylene glycol, propylene glycol, the isomeric butanediols, the isomeric pentanediols, the isomeric hexanediols, 2-ethylhexane-1,3-diol, glycerol, trimethylolethane, trimethylolpropane, cyclohexanediol, pentanediol, hexanediol, sugars, sugar derivatives, ether alcohols, for example 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid higher molecular weight polyethylene glycols, polypropylene glycols, mixed polyethylene/polypropylene glycols and the monoalkyl ethers thereof; polytetrahydrofuran alcohols, ester alcohols, for example ethylene glycol monoacetate, propylene glycol monoacetate, glycerol mono- and diacetate, glycerol monobutyrate or 2,2,4-trimethylpentane-1,3-diol monoisobutyrate; unsaturated alcohols, for example allyl alcohol, polyvinyl alcohols, hydroxyethyl (meth)acrylate, hydroxypropyl (meth)acrylate, 1,1-dimethyl allyl alcohol or oleyl alcohol; araliphatic alcohols, for example benzyl alcohol; N-monosubstituted amides, for example N-methylformamide, N-methylacetamide, cyanoacetamide or 2-pyrrolidinone or any desired mixtures, higher-functionality alcohols such as ditrimethylolpropane, pentaerythritol, dipentaerythritol or sorbitol Amines such as butylamine, stearylamine, ethanolamine, diethanolamine, triethanolamine, hydrazine, ethylenediamine, propylenediamine, butanediamine, pentane-1,5-diamine, hexane-1,6-di amine, octane-1,8-diamine, nonane-1,9-diamine, decane-1,10-diamine, undecane-1,11-diamine, dodecane-1,12-diamine, 2-methylpentane-1,5-diamine, 3-methylpentane-1,5-diamine, 2,2,4-trimethylhexane-1,6-diamine, 2,4,4-trimethylhexane-1,6-diamine, 2-methyloctane-1,8-diamine and 5-methylnonane-1,9-diamine, alicyclic diamines, cyclohexanediamine, methylcyclohexanediamine, isophoronediamine, norbornanedimethyldiamine, tricyclodecanedimethylamine, polyether amines, diethylenetriamine, aminoethylpiperazines, triethylenetetramines, tris(2-aminoethyl)amines, the isomers of methylenedicyclohexyl-4,4'-diamine, water-soluble (di)/(tri)thiols and thioethers.

More preferably, component B comprises at least one compound selected from the group consisting of glycerol, monoethylene glycol, butane-1,2-diol, butane-1,3-diol, butane-1,4-diol, trimethylolpropane, neopentyl glycol and diethylene glycol. Even more preferably, component B consists of at least one compound selected from the group consisting of glycerol, monoethylene glycol, butane-1,3-diol, butane-1,4-diol, trimethylolpropane, neopentyl glycol and diethylene glycol, and optionally water.

Preferably, component B is introduced into the adhesive composition as an aqueous solution. The thinning of the isocyanate-reactive component B with water preferably serves to reduce the viscosity of the isocyanate-reactive component B to such an extent that its processing is simplified or actually enabled.

In a further preferred embodiment, the isocyanate-reactive component B is stirred into the water-predispersed component A.

In a further particularly preferred embodiment, the isocyanate component A is stirred into component B that has already been dissolved or predispersed in water.

In a further preferred embodiment, the two components A and B are independently predissolved or dispersed in water and then combined.

Trimerization Catalyst C

The curing of the adhesive composition of the invention to give an adhesive is advantageously assisted by a suitable catalyst that brings about the crosslinking of isocyanate groups to give at least one structure selected from the group consisting of uretdione, isocyanurate, biuret, iminooxadiazinedione and oxadiazinetrione structures.

Consequently, the adhesive composition of the invention, in a preferred embodiment of the present invention, comprises at least one trimerization catalyst C.

Suitable catalysts for the process of the invention are in principle any compounds which accelerate the trimerization of isocyanate groups to isocyanurate structures. It is preferable to use a trimerization catalyst which does not accelerate or does not significantly accelerate the trimerization reaction below 25° C., especially below 30° C., preferably below 40° C., but significantly accelerates it above 60° C., especially above 70° C. What is meant here by "does not significantly accelerate" is that the presence of the trimerization catalyst in the reaction mixture below 25° C., especially below 30° C., preferably below 40° C., does not have any significant effect on the reaction rate of the reaction that proceeds in any case, or the pot life of the compositions thus obtained is ≥1 min and preferably ≥2 min. The pot life is the time taken for the viscosity of the composition to double.

Significant acceleration is understood to mean that the presence of the "thermally latent" catalyst in the reaction mixture above 60° C., especially above 70° C., has a distinct effect on the reaction rate of the reaction that proceeds in any case.

Since isocyanurate formation, depending on the catalyst used, is frequently accompanied by side reactions, for example dimerization to give uretdione structures or trimerization to form iminooxadiazinediones (called asymmetric trimers), and by allophanatization reactions in the case of presence of urethane groups in the starting polyisocyanate, the term "trimerization" shall also synonymously represent these reactions that proceed additionally in the context of the present invention.

In a particular embodiment, however, trimerization means that predominantly cyclotrimerizations of at least 50%, preferably at least 60%, more preferably at least 70% and especially at least 80% of the isocyanate groups present in the isocyanate composition A to give isocyanurate structural units are catalyzed. However, side reactions, especially those to give biuret, uretdione, allophanate, oxadiazinetrione and/or iminooxadiazinedione structures, typically occur and can even be used in a controlled manner in order to advantageously affect, for example, the Tg value of the adhesive obtained.

Suitable catalysts for the process of the invention are, for example, simple tertiary amines, for example triethylamine, tributylamine, N,N-dimethylaniline, N-ethylpiperidine or N,N'-dimethylpiperazine. Suitable catalysts also include the tertiary hydroxyalkylamines described in GB 2 221 465, for example triethanolamine, N-methyldiethanolamine, dimethylethanolamine, N-isopropyldiethanolamine and 1-(2-hydroxyethyl)pyrrolidine, or the catalyst systems that are known from GB 2 222 161 and consist of mixtures of tertiary bicyclic amines, for example DBU, with simple low molecular weight aliphatic alcohols.

Likewise suitable as trimerization catalysts for the process of the invention are a multitude of different metal compounds. Suitable examples are the octoates and naphthenates of manganese, iron, cobalt, nickel, copper, zinc, zirconium, cerium or lead or mixtures thereof with acetates of lithium, sodium, potassium, calcium or barium that are described as catalysts in DE-A 3 240 613, the sodium and potassium salts of linear or branched alkanecarboxylic acids having up to 10 carbon atoms that are disclosed by DE-A 3 219 608, such as of propionic acid, butyric acid, valeric acid, caproic acid, heptanoic acid, caprylic acid, pelargonic acid, capric acid and undecylenic acid, the alkali metal or alkaline earth metal salts of aliphatic, cycloaliphatic or aromatic mono- and polycarboxylic acids having 2 to 20 carbon atoms that are disclosed by EP-A 0 100 129, such as sodium benzoate or potassium benzoate, the alkali metal phenoxides disclosed by GB-A 1 391 066 and GB-A 1 386 399, such as sodium phenoxide or potassium phenoxide, the alkali metal and alkaline earth metal oxides, hydroxides, carbonates, alkoxides and phenoxides disclosed by GB 809 809, alkali metal salts of enolizable compounds and metal salts of weak aliphatic or cycloaliphatic carboxylic acids such as sodium methoxide, sodium acetate, potassium acetate, sodium acetoacetate, lead 2-ethylhexanoate, and lead naphthenate, the basic alkali metal compounds complexed with crown ethers or polyether alcohols that are disclosed by EP-A 0 056 158 and EP-A 0 056 159, such as complexed sodium carboxylates or potassium carboxylates, the pyrrolidinone potassium salt disclosed by EP-A 0 033 581, the mono- or polynuclear complex of titanium, zirconium and/or hafnium disclosed by application EP 13196508.9, such as zirconium tetra-n-butoxide, zirconium tetra-2-ethylhexanoate and zirconium tetra-2-ethylhexoxide, and tin compounds of the type described in *European Polymer Journal*, vol. 16, 147-148 (1979), such as dibutyltin dichloride, diphenyltin dichloride, triphenylstannanol, tributyltin acetate, tributyltin oxide, tin dioctoate, dibutyl(dimethoxy)stannane, and tributyltin imidazolate.

Further trimerization catalysts suitable for the process of the invention are, for example, the quaternary ammonium hydroxides known from DE-A 1 667 309, EP-A 0 013 880 and EP-A 0 047 452, for example tetraethylammonium hydroxide, trimethylbenzylammonium hydroxide, N,N-dimethyl-N-dodecyl-N-(2-hydroxyethyl)ammonium hydroxide, N-(2-hydroxyethyl)-N,N-dimethyl-N-(2,2'-dihydroxymethylbutyl)ammonium hydroxide and 1-(2-hydroxyethyl)-1,4-diazabicyclo[2.2.2]octane hydroxide (monoadduct of ethylene oxide and water onto 1,4-diazabicyclo[2.2.2]octane), the quaternary hydroxyalkylammonium hydroxides known from EP-A 37 65 or EP-A 10 589, for example N,N,N-trimethyl-N-(2-hydroxyethyl)ammonium hydroxide, the trialkylhydroxyalkylammonium carboxylates that are known from DE-A 2631733, EP-A 0 671 426, EP-A 1 599 526 and U.S. Pat. No. 4,789,705, for example N,N,N-trimethyl-N-2-hydroxypropylammonium p-tert-butylbenzoate and N,N,N-trimethyl-N-2-hydroxypropylammonium 2-ethylhexanoate, the quaternary benzylammonium carboxylates known from EP-A 1 229 016, for example N-benzyl-N,N-dimethyl-N-ethylammonium pivalate, N-benzyl-N,N-dimethyl-N-ethylammonium 2-ethylhexanoate, N-benzyl-N,N,N-tributylammonium 2-ethylhexanoate, N,N-dimethyl-N-ethyl-N-(4-methoxybenzyl) ammonium 2-ethylhexanoate or N,N,N-tributyl-N-(4-methoxybenzyl)ammonium pivalate, the tetrasubstituted ammonium α-hydroxycarboxylates known from WO 2005/087828, for example tetramethylammonium lactate, the quaternary ammonium or phosphonium fluorides known from EP-A 0 339 396, EP-A 0 379 914 and EP-A 0 443 167, for example N-methyl-N,N,N-trialkylammonium fluorides with $C_8$-$C_{10}$-alkyl radicals, N,N,N,N-tetra-n-butylammonium fluoride, N,N,N-trimethyl-N-benzylammonium fluoride, tetramethylphosphonium fluoride, tetraethylphosphonium fluoride or tetra-n-butylphosphonium fluoride, the quaternary ammonium and phosphonium polyfluorides known from EP-A 0 798 299, EP-A 0 896 009 and EP-A 0 962 455, for example benzyltrimethylammonium hydrogen polyfluoride, the tetraalkylammonium alkylcarbonates which are known from EP-A 0 668 271 and are obtainable by reaction of tertiary amines with dialkyl carbonates, or betaine-structured quaternary ammonioalkyl carbonates, the quaternary ammonium hydrogencarbonates known from WO 1999/023128, for example choline bicarbonate, the quaternary ammonium salts which are known from EP 0 102 482 and are obtainable from tertiary amines and alkylating esters of phosphorus acids, examples of such salts being reaction products of triethylamine, DABCO or N-methylmorpholine with dimethyl methanephosphonate, or the tetrasubstituted ammonium salts of lactams that are known from WO 2013/167404, for example trioctylammonium caprolactamate or dodecyltrimethylammonium caprolactamate.

Further trimerization catalysts C) suitable for the process according to the invention may be found, for example, in J. H. Saunders and K. C. Frisch, Polyurethanes Chemistry and Technology, p. 94 ff. (1962) and the literature cited therein.

The catalysts can be used in the process of the invention either individually or in the form of any desired mixtures with one another.

In a preferred embodiment, the trimerization catalysts used are soluble or dispersed in the aqueous phase and become available for the desired trimerization reaction only after coalescence or film formation of the hydrophilized isocyanate dispersion.

In another preferred embodiment, the trimerization catalysts used are soluble in the isocyanate phase.

Preferred catalysts are metal compounds of the aforementioned type, especially carboxylates and alkoxides of alkali metals, alkaline earth metals or zirconium, and organic tin compounds of the type mentioned.

Particularly preferred trimerization catalysts are sodium and potassium salts of aliphatic carboxylic acids having 2 to 20 carbon atoms and aliphatically substituted tin compounds.

Very particularly preferred trimerization catalysts for the process of the invention are potassium acetate, tin dioctoate and/or tributyltin oxide.

In one embodiment of the invention, the catalytic trimerization takes place in the presence of a trimerization catalyst, where the trimerization catalyst preferably comprises at least one alkali metal salt or alkaline earth metal salt.

In a preferred embodiment of the invention, the trimerization catalyst comprises potassium acetate as alkali metal salt and/or a polyether, especially a polyethylene glycol.

In the process according to the invention, the trimerization catalyst is generally used in a concentration based on the amount of the adhesive composition used of 0.0005% to 5.0% by weight, preferably of 0.0010% to 2.0% by weight and particularly preferably of 0.0015% to 1.0% by weight.

The trimerization catalysts that are used in the process of the invention generally have sufficient solubility or dispersibility either in isocyanates or in water in the amounts that are required for initiation of the oligomerization reaction. The addition of the catalyst to the adhesive composition is therefore preferably effected in neat form to the water phase or to the isocyanate phase.

Optionally, however, the catalysts can also be used dissolved in a suitable organic solvent to improve their incorporability. The thinning level of the catalyst solutions can be chosen freely within a very wide range. Such catalyst solutions are typically catalytically active above a concentration of about 0.01% by weight based on the total weight of catalyst and organic solvent.

Suitable catalyst solvents are, for example, solvents that are inert toward isocyanate groups, for example hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol ethyl and butyl ether acetate, propylene glycol monomethyl ether acetate, 1-methoxy-2-propyl acetate, 3-methoxy-n-butyl acetate, propylene glycol diacetate, acetone, methyl ethyl ketone, methyl isobutyl ketone, cyclohexanone, lactones, such as β-propiolactone, γ-butyrolactone, and ε-caprolactone, but also solvents such as N-methylpyrrolidone and N-methylcaprolactam, 1,2-propylene carbonate, methylene chloride, dimethyl sulfoxide, triethyl phosphate or any desired mixtures of such solvents.

If catalyst solvents are used in the process of the invention, preference is given to using catalyst solvents which bear groups reactive toward isocyanates and can be incorporated into the polyisocyanurate plastic. Examples of such solvents are mono- or polyhydric simple alcohols, for example methanol, ethanol, n-propanol, isopropanol, n-butanol, n-hexanol, 2-ethyl-1-hexanol, ethylene glycol, propylene glycol, the isomeric butanediols, 2-ethylhexane-1,3-diol or glycerol; ether alcohols, for example 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid higher molecular weight polyethylene glycols, polypropylene glycols, mixed polyethylene/polypropylene glycols and the monoalkyl ethers thereof; ester alcohols, for example ethylene glycol monoacetate, propylene glycol monolaurate, glycerol mono- and diacetate, glycerol monobutyrate or 2,2,4-trimethylpentane-1,3-diol monoisobutyrate; unsaturated alcohols, for example allyl alcohol, 1,1-dimethylallyl alcohol or oleyl alcohol; araliphatic alcohols, for example benzyl alcohol; N-monosubstituted amides, for example N-methylformamide, N-methylacetamide, cyanoacetamide or 2-pyrrolidinone, or any desired mixtures of such solvents.

For embodiments in which a high excess of isocyanate groups over isocyanate-reactive groups is used, especially in the case of molar excesses of at least 3:1, preference is given to using the trimerization catalysts listed below.

Suitable compounds are of formula (I)

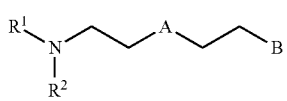

where $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl;

A is selected from the group consisting of O, S and $NR^3$ where $R^3$ is selected from the group consisting of hydrogen, methyl, ethyl, propyl, isopropyl, butyl and isobutyl; and B, independently of A, is selected from the group consisting of OH, SH, $NHR^4$ and $NH_2$, where $R^4$ is selected from the group consisting of methyl, ethyl and propyl.

In a preferred embodiment of the present invention, A is $NR^3$ where $R^3$ is selected from the group consisting of hydrogen, methyl, ethyl, propyl, isopropyl, butyl and isobutyl. Preferably, $R^3$ is methyl or ethyl. More preferably, $R^3$ is methyl.

In a first variant of this embodiment, B is OH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl.

In a second variant of this embodiment, B is SH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl.

In a third variant of this embodiment, B is $NHR^4$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl. In this variant, $R^4$ is selected from the group consisting of methyl, ethyl and propyl. Preferably, $R^4$ is methyl or ethyl. More preferably, $R^4$ is methyl.

In a fourth variant of this embodiment, B is $NH_2$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl.

In a further preferred embodiment of this invention, A is oxygen.

In a first variant of this embodiment, B is OH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl.

In a second variant of this embodiment, B is SH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl.

In a third variant of this embodiment, B is $NHR^4$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl. In this variant, $R^4$ is selected from the group consisting of methyl, ethyl and propyl. Preferably, $R^4$ is methyl or ethyl. More preferably, $R^4$ is methyl.

In a fourth variant of this embodiment, B is $NH_2$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl.

In yet a further preferred embodiment of this invention, A is sulfur.

In a first variant of this embodiment, B is OH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl.

In a second variant of this embodiment, B is SH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl.

In a third variant of this embodiment, B is $NHR^4$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl. In this variant, $R^4$ is selected from the group consisting of methyl, ethyl and propyl. Preferably, $R^4$ is methyl or ethyl. More preferably, $R^4$ is methyl.

In a fourth variant of this embodiment, B is $NH_2$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl.

Also suitable are adducts of a compound of formula (II) and a compound having at least one isocyanate group

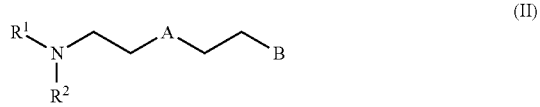

(II)

where $R^1$ and $R^2$ are independently selected from the group consisting of hydrogen, methyl, ethyl, propyl, isopropyl, butyl and isobutyl, branched C5-alkyl, unbranched C5-alkyl, branched C6-alkyl, unbranched C6-alkyl, branched C7-alkyl and unbranched C7-alkyl;

A is selected from the group consisting of O, S and $NR^3$ where $R^3$ is selected from the group consisting of H, methyl, ethyl, propyl, isopropyl, butyl and isobutyl; and B, independently of A, is selected from the group consisting of OH, SH, $NHR^4$ and $NH_2$, where $R^4$ is selected from the group consisting of methyl, ethyl and propyl.

Preferred Variants of the Compound of Formula (II)

In a preferred embodiment of the present invention, A is $NR^3$ where $R^3$ is selected from the group consisting of hydrogen, methyl, ethyl, propyl, isopropyl, butyl and isobutyl. Preferably, $R^3$ is methyl or ethyl. More preferably, $R^3$ is methyl.

In a first variant of this embodiment, B is OH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl.

In a second variant of this embodiment, B is SH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl.

In a third variant of this embodiment, B is $NHR^4$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl. In this variant, $R^4$ is selected from the group consisting of methyl, ethyl and propyl. Preferably, $R^4$ is methyl or ethyl. More preferably, $R^4$ is methyl.

In a fourth variant of this embodiment, B is $NH_2$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl.

In a further preferred embodiment of this invention, A is oxygen.

In a first variant of this embodiment, B is OH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl.

In a second variant of this embodiment, B is SH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl.

In a third variant of this embodiment, B is $NHR^4$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, $R^1$ and $R^2$ are independently methyl or ethyl. More preferably, $R^1$ and $R^2$ are methyl. In this variant, $R^4$ is selected from the group consisting of methyl, ethyl and propyl. Preferably, $R^4$ is methyl or ethyl. More preferably, $R^4$ is methyl.

In a fourth variant of this embodiment, B is NH$_2$ and R$^1$ and R$^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, R$^1$ and R$^2$ are independently methyl or ethyl. More preferably, R$^1$ and R$^2$ are methyl.

In yet a further preferred embodiment of this invention, A is sulfur.

In a first variant of this embodiment, B is OH and R$^1$ and R$^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, R$^1$ and R$^2$ are independently methyl or ethyl. More preferably, R$^1$ and R$^2$ are methyl.

In a second variant of this embodiment, B is SH and R$^1$ and R$^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, R$^1$ and R$^2$ are independently methyl or ethyl. More preferably, R$^1$ and R$^2$ are methyl.

In a third variant of this embodiment, B is NHR$^4$ and R$^1$ and R$^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, R$^1$ and R$^2$ are independently methyl or ethyl. More preferably, R$^1$ and R$^2$ are methyl. In this variant, R$^4$ is selected from the group consisting of methyl, ethyl and propyl. Preferably, R$^4$ is methyl or ethyl. More preferably, R$^4$ is methyl.

In a fourth variant of this embodiment, B is NH$_2$ and R$^1$ and R$^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. Preferably, R$^1$ and R$^2$ are independently methyl or ethyl. More preferably, R$^1$ and R$^2$ are methyl.

The umbrella term "adduct" is understood to mean urethane, thiourethane and urea adducts of a compound of formula (II) with a compound having at least one isocyanate group. A urethane adduct is particularly preferred. The adducts of the invention are formed when an isocyanate reacts with the functional group B of the compound defined in formula (II). When B is a hydroxyl group a urethane adduct is formed. When B is a thiol group a thiourethane adduct is formed. And when B is NH$_2$ or NHR$^4$ a urea adduct is formed.

All isocyanates are useful in principle for the preparation of the adducts of the invention. But preference is given to isocyanates having aliphatically or cycloaliphatically bonded isocyanate groups. Monomeric and oligomeric polyisocyanates are also suitable. Since a suitable isocyanate must have at least one isocyanate group, monoisocyanates are likewise suitable for preparation of the adducts of the invention. In addition, it is also possible to use any prepolymer bearing isocyanate groups.

In a preferred embodiment of the present invention, the isocyanate used for preparation of the adduct is selected from the group consisting of BDI, HDI, PDI, IPDI, oligomerized HDI, oligomerized PDI and oligomerized IPDI, mixtures of the aforementioned isocyanates and reaction products of the aforementioned isocyanates to the extent that these reaction products still contain at least one free isocyanate group.

Further suitable examples are the octoates and naphthenates of manganese, cobalt, nickel, copper, zinc, zirconium or cerium or mixtures thereof with acetates of lithium, sodium, potassium, calcium or barium that are described as catalysts in DE-A 3 240 613, the sodium, potassium and zinc salts of linear or branched alkanecarboxylic acids having up to 10 carbon atoms that are known from DE-A 3 219 608, for example of propionic acid, butyric acid, valeric acid, caproic acid, heptanoic acid, caprylic acid, pelargonic acid, capric acid and undecylenic acid, the alkali metal or alkaline earth metal salts of aliphatic, cycloaliphatic or aromatic mono- and polycarboxylic acids having 2 to 20 carbon atoms that are known from EP-A 0 100 129, for example sodium, potassium or zinc benzoate, the alkali metal phenoxides known from GB-A 1 391 066 and GB-A 1 386 399, for example sodium, potassium or zinc phenoxide, the alkali metal and alkaline earth metal oxides, hydroxides, carbonates, alkoxides and phenoxides known from GB 809 809, alkali metal salts of enolizable compounds and metal salts of weak aliphatic or cycloaliphatic carboxylic acids, for example sodium methoxide, sodium acetate, potassium acetate, sodium acetoacetate, the basic alkali metal compounds complexed with crown ethers or polyether alcohols that are known from EP-A 0 056 158 and EP-A 0 056 159, for example complexed sodium or potassium carboxylates, the pyrrolidinone-potassium salt known from EP-A 0 033 581. Further metal catalysts are described by Blank et al. in Progress in Organic Coatings, 1999, Vol. 35, pages 19-29.

Particularly preferred organozinc compounds are zinc octoate, zinc naphthenate, zinc tallate, zinc carboxylates (C$_8$-C$_{14}$) and zinc acetate.

In addition, fluoride-containing compounds, i.e. compounds having at least one fluoride anion, are particularly suitable. The compound having at least one fluoride anion is preferably selected from at least one compound from the group formed by fluorides, difluorides and adducts of at least one fluoride anion onto hydrogenfluoride (hydrogenpolyfluorides). Hydrogenpolyfluorides are commercially available to some degree or can be prepared in a simple manner and in any stoichiometry by blending appropriate fluorides with the desired amount of HF. By comparison with free hydrogen fluoride, which is physiologically unpleasant, hydrogenpolyfluorides are less problematic.

Preferably, the composition of the invention, as compound having at least one fluoride anion, comprises at least one compound of the general formula IV

{M[nF.m(HF)]} (IV)

where M is an equivalent of one or more cations that bears a charge of n as a cationic charge and brings about electronic neutrality of the compound of the formula (IV), n is a number from 1 to 6, especially from 1 to 4, more preferably from 1 to 2, m is a number from 0 to 5. It is preferable here in accordance with the invention when m in formula (IV) is a number from 0 to 5, more preferably from 0 to 2; most preferably, m in formula (IV) is 0 or 1.

More preferably, in formula (IV), n is the number 1 and m is 0 or 1.

Preferably in turn, in formula (IV), n is 1 and m is 1.

M is one equivalent of one or more cations of the same or different type that assures the electronic neutrality of the compound. The cations of this equivalent may be the same or different. For example, when n=1 and m=1 and the cation is Ca$^{2+}$, the equivalent of M needed for electronic neutrality is 0.5 Ca$^{2+}$.

Preference is given in accordance with the invention to those compositions that are characterized in that the compound having at least one fluoride anion of formula (IV) comprises an n-tuply charged cation as M, and n=1 and m=0 or 1.

Compounds of component b) used may be one or more metal fluorides with alkali metal ions, for example, such as LiF, KF, NaF, RbF, CsF, or alkaline earth metal cations, such as BeF$_2$, MgF$_2$, CaF$_2$, SrF$_2$, BaF$_2$. This also includes fluorides of the transition metals, such as AgF, AgF$_2$, ZnF$_2$, CuF$_2$, CuF$_2$.H$_2$O, NiF$_2$, SnF$_2$, InF$_3$, ScF$_3$, TiF$_3$, MnF$_3$, CoF$_3$, CrF$_3$, AuF$_3$, FeF$_3$, MnF$_3$, BiF$_3$, SbF$_3$, PdF$_2$, GeF$_4$, HfF$_4$, PdF$_4$, VF$_3$, SbF$_5$, TaF$_5$, WF$_6$, H$_2$ZrF$_6$, K$_2$NiF$_6$, K$_2$ZrF$_6$, K$_2$TiF$_6$. Also rare earth fluorides such as SmF$_3$, LaF$_3$, YbF$_3$, YtF$_3$, CeF$_3$, EuF$_3$, CeF$_4$, ErF$_3$, LuF$_3$, NdF$_3$, NbF$_5$, HoF.

It is also possible to use organic fluoride compounds, such as phenylmethanesulfonyl fluoride, dimesitylboron fluoride, N-(1,1-dimethyl-2-oxopropylthio)-N-methylcarbamoyl fluoride, methanesulfonyl fluoride, ethanesulfonyl fluoride, perfluoro-1-octane sulfonyl fluoride, 4-amidinophenylmethanesulfonyl fluoride hydrochloride, p-toluenesulfonyl fluoride, derivatives thereof, or mixtures thereof. It is preferable here in turn when organic fluoride compounds obey the formula (II) and M is one equivalent of an organic cation.

As further inventive organic cations of the equivalent M of the formula (IV), it is possible to use tetraalkylammonium compounds and also tetraalkylphosphonium compounds, where the alkyl groups of the tetraalkylammonium or tetraalkylphosphonium groups preferably consist of linear or branched, optionally cyclic, alkylene groups formed from 2 to 12 carbon atoms. Preference is given in accordance with the invention to those compositions that are characterized in that the compound having at least one fluoride anion of formula (IV) is an n-tuply charged cation as M, and n=1 and m=0 or 1. Suitable compositions are more preferably those in which the compound having at least one fluoride anion has a structure of the specified general formula IV with n=1 and m=0, and the cation M is selected from alkali metal ions, tetraalkylammonium or tetraalkylphosphonium ions or mixtures thereof.

Preference is given to those systems of the general formula IV containing, as cationic constituents, potassium, tetraalkylammonium or tetraalkylphosphonium ions and mixtures thereof. Preferred anions are those of the general structure IV with n=1 and m=0 or 1 and mixtures thereof, and preference is given in turn to structures of the formula IV with n=1 and m=1.

The catalyst used may preferably be at least one compound of the formula (IV-1):

$$R_4E^+[F^-.m(HF)] \quad (IV-1)$$

where

E is N or P, R is identical or different, optionally branched, optionally cyclic, optionally substituted (O, N, halogen), aliphatic, araliphatic and aromatic radicals each having 1 to 25 carbon atoms, or two R radicals together with the quaternary nitrogen atom or the quaternary phosphorus atom in each case independently form a 5-membered or 6-membered ring, and for m:m is a number from 0 to 5; more preferably, m is 0 or 1; most preferably, m is 1. If two R radicals, in pairs in each case, together with the quaternary nitrogen atom or the quaternary phosphorus atom form a 5-membered or 6-membered ring, a cationic spiro compound is obtained. Preferentially suitable in accordance with the invention are corresponding spiro cations as described in patent application WO 2015/124504 A1 (see formula (I) therein), especially in claims 1 and 2 of this document. Reference is made explicitly and completely to this document.

Such catalysts used are preferably compounds of the formula (IV-1) where E is N or P, R is identical or different, optionally branched, optionally substituted (O, N, halogen) (cyclo)aliphatic and araliphatic radicals each having 1 to 20 carbon atoms and m is a number from 0 to 5; more preferably, m is 0 or 1; most preferably, m is 1.

One example of the latter is benzyltrimethylammonium hydrogenpolyfluorides of the formula (IV-2):

$$C_6H_5CH_2(CH_3)_3N^+[F^-.m(HF)] \quad (II-2),$$

and tetraalkylammonium hydrogenpolyfluorides of the formula (II-3) and tetraalkylphosphonium hydrogenpolyfluorides of the formula (IV-4):

$$R_4N^+[F^-.m(HE)] \quad (IV-3),$$

$$R_4P^+[F^-.m(HE)] \quad (IV-4),$$

where R is identical or different, optionally branched, (cyclo)aliphatic radicals each having 1 to 20 carbon atoms or two R radicals together with the quaternary nitrogen atom or the quaternary phosphorus atom in each case independently form a 5-membered or 6-membered ring, and m is a number from 0 to 5; more preferably, m is 0 or 1; most preferably, m is 1. If two R radicals, in pairs in each case, together with the quaternary nitrogen atom or the quaternary phosphorus atom form a 5-membered or 6-membered ring, a cationic spiro compound is obtained. Preferentially suitable in accordance with the invention are corresponding spiro cations as described in the formula (I) of patent application WO 2015/124504 A1, especially in claims 1 and 2 of this document. Reference is made explicitly and completely to this document.

Catalysts used are more preferably compounds of the formula (IV-5) and/or of the formula (IV-6):

$$R_4N^+[F^-.m(HF)] \quad (IV-5),$$

$$R_4P^+[F^-.m(HF)] \quad (IV-6),$$

where

R is identical or different, optionally branched, (cyclo) aliphatic radicals each having 1 to 20 carbon atoms or two R radicals together with the quaternary nitrogen atom or the quaternary phosphorus atom in each case independently form a 5-membered or 6-membered ring, and m is a number from 0 to 5, preferably from 0 to 2, most preferably 0 or 1. If two R radicals, in pairs in each case, together with the quaternary nitrogen atom or the quaternary phosphorus atom form a 5-membered or 6-membered ring, a spiro compound is obtained as cation. Preferentially suitable in accordance with the invention are corresponding spiro compounds as cations as described in patent application WO 2015/124504 A1, to which reference is made explicitly and completely.

Preferred compounds having at least one fluoride anion are selected from at least one compound from the group formed from tetrabutylammonium fluoride, tetrabutylphosphonium fluoride, tetraethylammonium fluoride, tetraethylphosphonium fluoride, piperidinium-1-spiro-1'-pyrrolidinium fluoride, tetramethylammonium fluoride, potassium hydrogendifluoride, tetrabutylammonium hydrogendifluoride, tetrabutylphosphonium hydrogendifluoride, tetraethyl ammonium hydrogendifluoride, tetraethylphosphonium hydrogendifluoride, piperidinium-1-spiro-1-pyrrolidinium hydrogendifluoride, tetramethylammonium hydrogendifluoride.

It is possible to use a single compound having at least one fluoride anion or else, in certain cases, a mixture of various compounds among these.

In order to increase the solubility of the fluoride ions or the mixture thereof, it is also possible to use chelate ligands. These include acetylacetone, iminodiacetate, nitrilotriacetate, bis(salicylidene)ethylenediamine, ethylenediaminetriacetate, ethylenediaminetetraacetate, diethylenetriaminepentaacetate, 1,4,7,10-tetraazacyclododecane-1,4,7,10-tetraacetate, oxalate, tartrate, citrate, dimethylglyoxime, 8-hydroxyquinoline, crown ethers, for example 18-crown-6, dimercaptosuccinic acid, 1,2-bis(diphenylphosphino)ethane.

The compound having at least one fluoride anion (or mixtures of two or more of these compounds) may also be thinned with a solvent. It is of course possible or in some cases even preferable to use mixtures of different compounds with at least one fluoride anion. Examples of such solvents are 2-ethylhexanol, acetone, 2-butanone, methyl isobutyl ketone, butyl acetate, ethyl acetate, 1-methoxy-2-propyl acetate (MPA), 3-methoxy-1-butyl acetate, propylene n-butyl ether, toluene, methyl ethyl ketone, xylene, 1,4-dioxane, diacetone alcohol, methanol, ethanol, isopropanol, ethylene glycol, diethylene glycol, N-methylpyrrolidone, dimethylacetamide, dimethylformamide, dimethyl sulfoxide, methyl ethyl ketone, solvent naphtha (hydrocarbon mixture) or any mixtures of such solvents.

Urethanization Catalyst D

In a preferred embodiment of the present invention, the adhesive composition of the invention comprises a urethanization catalyst D, optionally in addition to a trimerization catalyst. This is especially preferred when the adhesive composition of the invention additionally comprises an isocyanate-reactive component B as defined above. "Urethanization catalyst" in this application is understood to mean any compound that can accelerate the reaction of hydroxyl and isocyanate groups to give urethane groups. Since urethanization catalysts typically also catalyze urea formation, catalysts that accelerate the formation of urea groups from isocyanate and amino groups are also referred to hereinafter synonymously as urethanization catalysts.

Since the urethanization reaction or urea formation, depending on the catalyst used, is frequently accompanied by side reactions, for example allophanate formation or biuret formation, the term "urethanization" in the context of the present invention shall also synonymously represent these reactions that proceed additionally.

In a particular embodiment, however, urethanization means that predominantly at least 20%, preferably at least 50%, more preferably at least 70% and especially at least 80% of the isocyanate groups present in the reaction mixture are converted to urethane groups. However, side reactions, especially those to give allophanate and/or biuret and/or urea, typically occur and can even be used in a controlled manner in order to advantageously affect, for example, the Tg of the adhesive obtained.

It is preferable to use a urethanization catalyst which does not accelerate or does not significantly accelerate the urethanization reaction below 25° C., especially below 30° C., preferably below 40° C., but significantly accelerates it above 60° C., especially above 70° C. Such a catalyst is referred to as "thermally latent". What is meant here by "does not significantly accelerate" is that the presence of the urethanization catalyst in the reaction mixture below 25° C., especially below 30° C., preferably below 40° C., does not have any significant effect on the reaction rate of the reaction that proceeds in any case. Significant acceleration is understood to mean that the presence of the thermally latent catalyst in the reaction mixture above 60° C., especially above 70° C., has a distinct effect on the reaction rate of the reaction that proceeds in any case.

In principle, all catalysts known for preparation of polyurethanes are usable as urethanization catalyst D. Examples include triethylamine, 1,4-diazabicyclo[2.2.2]octane, dibutyltin oxide, tin dioctoate, dibutyltin dilaurate, tin bis(2-ethylhexanoate), zinc dioctoate, zinc bis(2-ethylhexanoate) or other organometallic compounds. It has been found to be of particular practical relevance when the catalyst used is a catalyst selected from the group consisting of dibutyltin dilaurate, zinc dioctoate, zinc bis(2-ethylhexanoate) and lithium molybdate. The catalyst is preferably selected from the group consisting of zinc bis(2-ethylhexanoate) and catalysts which promote the formation of oxazolidinones and also isocyanurates, and mixtures thereof. The catalysts may also, according to the composition of the reaction mixture, selection of the functionalizing reagent and reaction conditions, also be selected from the compounds enumerated below for the catalysts in the appropriate amounts and optionally with use of the catalyst solvents specified below.

In a particular embodiment, latent urethanization catalysts that catalyze a urethanization reaction in a controlled manner only at relatively high temperatures are used, and hence enable drying of the adhesive composition below the activation temperature of the latent catalyst. This affords particularly homogeneous and high-quality adhesive films.

In a preferred embodiment, latent urethanization catalysts are metered into the component comprising hydrophilized isocyanates.

A latent urethanization catalyst of the invention comprises one or more cyclic tin compounds of the formula F-I, F-II and/or F-III:

(F-I)

with n > 1

(F-II)

with n > 1

(F-III)

where:

D is —O—, —S— or —N(R1)-
  where R1 is a saturated or unsaturated, linear or branched, aliphatic or cycloaliphatic radical or an optionally substituted aromatic or araliphatic radical which has up to 20 carbon atoms and may optionally contain heteroatoms from the group of oxygen, sulfur, nitrogen, or is hydrogen or the radical

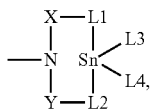

or R1 and L3 together are —Z-L5-;
D* is —O— or —S—;
X, Y and Z are identical or different radicals selected from alkylene radicals of formulae —C(R2)(R3)-, —C(R2)(R3)-C(R4)(R5)- or —C(R2)(R3)-C(R4)(R5)-C(R6)(R7)- or ortho-arylene radicals of formulae

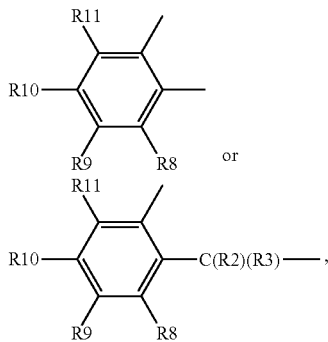

where R2 to R11 are independently saturated or unsaturated, linear or branched, aliphatic or cycloaliphatic or optionally substituted aromatic or araliphatic radicals which have up to 20 carbon atoms and may optionally contain heteroatoms from the group of oxygen, sulfur, nitrogen, or are hydrogen;
L1, L2 and L5 are independently —O—, —S—, —OC(=O)—, —OC(=S)—, —SC(=O)—, —SC(=S)—, —OS(=O)₂O—, —OS(=O)₂— or —N(R12)-,
  where R12 is a saturated or unsaturated, linear or branched, aliphatic or cycloaliphatic radical or an optionally substituted aromatic or araliphatic radical which has up to 20 carbon atoms and may optionally contain heteroatoms from the group of oxygen, sulfur, nitrogen, or is hydrogen;
L3 and L4 are independently —OH, —SH, —OR13, -Hal, —OC(=O)R14, —SR15, —OC(=S)R16, —OS(=O)₂OR17, —OS(=O)₂R18 or —NR19R20, or L3 and L4 together represent -L1-X-D-Y-L2-,
  where R13 to R20 are independently saturated or unsaturated, linear or branched, aliphatic or cycloaliphatic or optionally substituted aromatic or araliphatic radicals which have up to 20 carbon atoms and may optionally contain heteroatoms from the group of oxygen, sulfur, nitrogen, or are hydrogen.

The tin compounds of the formulae F-I, F-II and F-III are thermally labile. Below a certain temperature, they do not exhibit industrially useful catalytic activity for the reaction of NCO groups with functional groups bearing Zerewitinoff-active hydrogen atoms. The reactions in question here are especially urethanizations and urea formations. Above a certain temperature, however, there is a significant rise in catalytic activity. Without being limited to a theory, it is assumed that then the ligands completely or partially dissociate Sn center and therefore the Sn center is available as a catalyst. The catalysts may therefore be referred to as thermally latent catalysts. Because the NCO groups present in the build material do not react below this temperature, the build material is also easy to reuse.

In the cases in which the tin compounds of the formulae F-I, F-II and/or F-III have ligands with free OH radicals and/or NH radicals, the catalyst can be incorporated into the product in the polyisocyanate polyaddition reaction. A particular advantage of these incorporable catalysts is their markedly reduced fogging behavior.

The different methods of preparation for the tin(IV) compounds for use in accordance with the invention or their tin(II) precursors are described inter alia in: *J. Organomet. Chem.* 2009 694 3184-3189, *Chem. Heterocycl. Comp.* 2007 43 813-834, *Indian J. Chem.* 1967 5 643-645 and in literature cited therein.

The content of the tin compounds of the formulae F-I, F-II and/or F-III in the isocyanate phase containing hydrophilized isocyanates may be made dependent on the type of isocyanates. For instance, when NCO groups bonded to an aromatic carbon atom are dominant, the content may be ≤100 ppm, based on the total weight of the build material. When NCO groups bonded to an aliphatic carbon atom are dominant, the content may be ≤3000 ppm, based on the total weight of the isocyanate phase containing hydrophilized isocyanates.

A further preferred embodiment provides that as the cyclic tin compound one or more of the following compounds are employed:
4,12-di-n-butyl-1,7,9,15-tetraoxa-4,12-diaza-8-stannaspiro [7.7]pentadecane,
4,12-di-n-butyl-2,6,10,14-tetramethyl-1,7,9,15-tetraoxa-4,12-diaza-8-stannaspiro[7.7]pentadecane,
2,4,6,10,12,14-hexamethyl-1,7,9,15-tetraoxa-4,12-diaza-8-stannaspiro[7.7]pentadecane,
4,12-di-n-octyl-2,6,10,14-tetramethyl-1,7,9,15-tetraoxa-4,12-diaza-8-stannaspiro[7.7]pentadecane,
4,12-di-n-octyl-1,7,9,15-tetraoxa-4,12-diaza-8-stannaspiro [7.7]pentadecane,
4,12-dimethyl-1,7,9,15-tetraoxa-4,12-diaza-8-stannaspiro [7.7]pentadecane,
1,1-dichloro-5-methyl-5-aza-2,8-dioxa-1-stannacyclooctane,
1,1-diisopropyl-5-methyl-5-aza-2,8-dioxa-1-stannacyclooctane,
1,1-dibenzoyl-3,3,7,7-tetramethyl 5-n-octyl-5-aza-2,8-dioxa-1-stannacyclooctane,
1,1-dibenzoyl-5-n-octyl-5-aza-2,8-dioxa-1-stannacyclooctane,
1,1-bis(p-dodecylphenylsulfonyl)-5-n-octyl-5-aza-2,8-dioxa-1-stannacyclooctane,
2-benzoyloxy-6-octyl-4,8-dioxo-1,3,6,2-dioxazastannocan-2-yl benzoate
or mixtures thereof.

Further urethanization and trimerization catalysts suitable for the process of the invention can be found, for example, in J. H. Saunders and K. C. Frisch, Polyurethanes Chemistry and Technology, parts 1 and 2, and the literature cited therein.

The catalysts can be used in the process of the invention either individually or in the form of any desired mixtures with one another.

In a preferred embodiment, the urethanization catalysts used are soluble in the aqueous phase.

In another preferred embodiment, the urethanization catalysts used are soluble in the isocyanate phase.

The urethanization catalysts that are used in the process of the invention generally have sufficient solubility either in the isocyanate component A or in water or in the isocyanate-reactive component B in the amounts that are required for initiation of the crosslinking. The catalyst is therefore preferably added to the adhesive composition in neat form.

Optionally, however, the catalysts can also be used dissolved in a suitable organic solvent to improve their incorporability. The thinning level of the catalyst solutions can be chosen freely within a very wide range. Such catalyst solutions are typically catalytically active above a concentration of about 0.01% by weight based on the total weight of catalyst and organic solvent.

Suitable catalyst solvents are, for example, solvents that are inert toward isocyanate groups, for example hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol ethyl and butyl ether acetate, propylene glycol monomethyl ether acetate, 1-methoxy-2-propyl acetate, 3-methoxy-n-butyl acetate, propylene glycol diacetate, acetone, methyl ethyl ketone, methyl isobutyl ketone, cyclohexanone, lactones, such as β-propiolactone, γ-butyrolactone, ε-caprolactone and ε-methylcaprolactone, but also solvents such as N-methylpyrrolidone and N-methylcaprolactam, 1,2-propylene carbonate, methylene chloride, dimethyl sulfoxide, triethyl phosphate or any desired mixtures of such solvents.

If catalyst solvents are used in the process of the invention, in one embodiment, preference is given to using catalyst solvents which bear groups reactive toward isocyanates and can be incorporated into the polyisocyanurate plastic. Examples of such solvents are mono- or polyhydric simple alcohols, for example methanol, ethanol, n-propanol, isopropanol, n-butanol, n-hexanol, 2-ethyl-1-hexanol, ethylene glycol, propylene glycol, the isomeric butanediols, 2-ethylhexane-1,3-diol or glycerol; ether alcohols, for example 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid higher molecular weight polyethylene glycols, polypropylene glycols, mixed polyethylene/polypropylene glycols and the monoalkyl ethers thereof; ester alcohols, for example ethylene glycol monoacetate, propylene glycol monolaurate, glycerol mono- and diacetate, glycerol monobutyrate or 2,2,4-trimethylpentane-1,3-diol monoisobutyrate; unsaturated alcohols, for example allyl alcohol, 1,1-dimethylallyl alcohol or oleyl alcohol; araliphatic alcohols, for example benzyl alcohol; N-monosubstituted amides, for example N-methylformamide, N-methylacetamide, cyanoacetamide or 2-pyrrolidinone, or any desired mixtures of such solvents.

Auxiliaries

The adhesives obtainable with the adhesive composition of the invention, even as such, i.e. without addition of appropriate auxiliaries and additives, feature very good light stability. Nevertheless, it is optionally also possible to use standard auxiliaries and additives in the production thereof, for example standard fillers, UV stabilizers, antioxidants, mold release agents, water scavengers, slip additives, defoamers, leveling agents, rheology additives, flame retardants and/or pigments. These auxiliaries and additives, excluding fillers and flame retardants, are typically present in an amount of not more than 10% by weight, preferably not more than 5% by weight and more preferably not more than 3% by weight, based on the solids content of the adhesive composition of the invention. Flame retardants are typically present in amounts of not more than 70% by weight, preferably not more than 50% by weight and more preferably not more than 30% by weight, calculated as the total amount of flame retardants used, based on the solids content of the adhesive composition of the invention.

Advantages of the Adhesive Composition of the Invention

The adhesives of the invention are low in solvent or free of solvents and hence have considerable ecological advantages. Even the use of an isocyanate component A without additional isocyanate-reactive component B enables the production of adhesives having good performance properties. In particular, transparent adhesives having high strength of at least 5 N/mm$^2$ in the tensile shear test according to DIN EN 465, preferably at least 7 N/mm$^2$ and more preferably at least 9 N/mm$^2$ are obtained.

Conventional water-dispersed polymeric polyols must be stored within a relatively narrow temperature range in order to maintain their stability. The water-soluble isocyanate-reactive component B of the invention, by contrast, remains stably dissolved even at temperatures below the freezing point. Thus, the present application discloses water-based (and hence low-solvent) adhesive compositions that have distinctly elevated thermal stability compared to conventional water-based and isocyanate-containing adhesive compositions. This simplifies application and considerably extends the spectrum of possible fields of use.

Use

In a further embodiment, the present invention relates to the use of the adhesive composition of the invention for bonding of a substrate to at least one second substrate.

The adhesive composition of the invention is applied here to at least one substrate, possibly dried, and contacted with a second substrate and then cured. The contacting is preferably effected under pressure and temperature.

The applying to a substrate can be effected by all suitable methods known to the person skilled in the art. These are preferably spraying, painting, dipping, flow coating, or printing. The adhesive composition of the invention can also be applied to any desired substrates in one or more layers with the aid of brushes, rolls or doctor blades. Preferred substrates are metal, wood, glass, stone, ceramic materials, concrete, hard and flexible plastics, textiles, leather and paper. Particularly preferred substrates are porous and/or water-absorbing substrates such as wood, leather, concrete, textiles, paper.

The curing is preferably effected at temperatures between 10° C. and 250° C. Where the adhesive composition of the invention comprises catalysts, the curing is preferably effected within a temperature range in which the catalyst(s) is/are active.

The curing is preferably performed until the trimerization reaction and/or urethanization reaction to give polyisocyanurate structures or urethane or urea structures is very substantially complete. "Very substantially complete" may be considered in the context of the present invention to mean a residual isocyanate content of ≤20%, preferably ≤10%, preferably ≤5%, or when at least 80%, preferably at least 90%, more preferably at least 95%, of the free isocyanate groups originally present in the adhesive composition of the invention have reacted. The percentage of isocyanate groups still present can be determined by comparison of the content of isocyanate groups in % by weight in the original adhesive composition with the content of isocyanate groups in % by weight in the reaction product, for example by the comparison of the intensity of the isocyanate band at about 2270 cm$^{-1}$ by means of IR spectroscopy.

Method

In a further embodiment, the present invention relates to a method of producing a bonded join, comprising the steps of
- a) thinning an isocyanate component A containing at least one hydrophilized polyisocyanate with water, such that the isocyanate groups of the hydrophilized isocyanate are in direct contact with water;
- b) applying the adhesive composition obtained in method step a) to at least one substrate and contacting the coated substrate with at least one second substrate; and
- c) curing the adhesive composition, with the proviso that the curing adhesive composition has a content of polymeric polyols of not more than 10% by weight.

All definitions given further up for the isocyanate component A, the hydrophilized polyisocyanate and the mixing ratio of isocyanate and water are also applicable to this embodiment. The same applies to the proportion of polymeric polyols in method step c).

The polyisocyanate component A can be thinned with water by any methods commonly used in the prior art. "Thinning" in the context of the present invention differs from the "reacting" of a polyisocyanate component in that at least 90% of the free isocyanate groups of the polyisocyanate component that were present prior to the thinning are conserved. Since isocyanate groups can react with water to give amino groups under suitable reaction conditions, the isocyanate component A is thinned with water not more than 12 hours, preferably not more than 6 hours, even more preferably not more than 4 hours, prior to the application of the adhesive composition to a substrate. In the dissolution or dispersion of the polyisocyanate component A in water, further compounds having isocyanate-reactive groups are added at most in such an amount that the molar ratio of isocyanate groups to amino groups (except for water) that form a solid interface layer with the isocyanate within a period of ≤10 min, for example high-functionality primary amines via the formation of a solid polyurea interface layer between the water phase and the isocyanate phase, is at least 30:1. At the end of method step a), there is a mixture of polyisocyanate component A and water in which the two components are not separated by a solid phase. More particularly, the polyisocyanate A is not encapsulated and hence isolated from the water. Even between method steps a) and b), there is preferably no reaction in the adhesive composition that leads to formation of a solid phase between polyisocyanate component A and water before the formation of the adhesive bond, such that, at the start of method step b), at least 90% of the isocyanate groups present in the polyisocyanate component are in direct contact with water.

If a water-soluble isocyanate-reactive component B is present, it is preferable that the isocyanate component A is thinned with water by adding it to an aqueous solution of the isocyanate-reactive component B. In this embodiment, the water required for thinning is thus not used in pure form, but as a mixture with another component.

In a preferred embodiment of the present invention, in method step b), the adhesive composition applied to the substrate is dried before the coated substrate is contacted with a second substrate. This is preferred especially in the case of those substrates where the water cannot escape from the bonded join since they are nonporous. The drying is preferably continued until at least 70% by weight, preferably at least 80% and most preferably at least 90% of the water originally present in the adhesive composition applied has evaporated.

The term "contacting of the coated substrate with a second substrate" means that the coating applied to the first substrate is brought into contact with the second substrate. This is preferably done under pressure, preferably at a pressure of at least 1 bar, more preferably at least 2 bar and especially preferably at least 5 bar. The second substrate may have any surface characteristics, provided that the surface characteristics thereof enable adhesion of the adhesive composition of the invention. In a preferred embodiment of the present invention, the second substrate has likewise been coated with the adhesive composition of the invention.

The trimerization catalyst C may be present here in the water used for thinning. Alternatively, it may already be present in the isocyanate composition A to be thinned. It is likewise possible to add the trimerization catalyst C to the water-thinned isocyanate composition A after the thinning of the isocyanate composition A.

It is additionally preferable that at least 90% of the free isocyanate groups of the isocyanate component A that were present at the start of method step a) are still present at the start of method step b). A significant reaction of free isocyanate groups after the thinning of the isocyanate component A and prior to application thereof to the substrate is thus undesirable.

Methods and apparatuses for applying the adhesive composition to a substrate and suitable substrates have been described further up in this application.

In a particularly preferred embodiment of the present invention, the water-thinned isocyanate component A obtained in method step a) is mixed with an isocyanate-reactive component B prior to performance of method step b).

All the further definitions given above for the isocyanate-reactive component B are applicable to this embodiment as well.

When the adhesive composition of the invention comprises an isocyanate-reactive component B, a water-thinned isocyanate component A is preferably prepared separately from the isocyanate-reactive component B as described above. The isocyanate-reactive component B, if required, is thinned with water and then mixed with the water-thinned isocyanate component A. This mixing is effected at most 12 hours, preferably at most 6 hours, more preferably at most 4 hours, prior to the application of the adhesive composition to a substrate. In a preferred embodiment, the water-thinned isocyanate component A and the isocyanate-reactive component B are mixed during the applying of the adhesive composition of the invention to a substrate. This can particularly advantageously be effected using the apparatuses and methods that are already known for application of two-component polyurethane adhesives.

In the case of combined use of a water-thinned isocyanate component A and an isocyanate-reactive component B, a urethanization catalyst D is preferably added to the adhesive composition of the invention. More preferably, both a trimerization catalyst C and a urethanization catalyst D are added. The catalysts can be added collectively or separately to each component (A or B) of the adhesive composition. A catalyst or in the case of it is also possible to add any desired starting compound (unthinned isocyanate component A, isocyanate-reactive component B, water used for thinning).

In a particularly preferred embodiment of the present invention, the catalysts C and/or D are applied to the substrate in at least two layers separately from the isocyanate component A and optionally the isocyanate-reactive component B. This method is described in detail in the European patent application with application number 17163485.0.

The method of the invention gives rise to high-quality adhesives having a very substantially homogeneous distribution of the hydrophilized isocyanates converted. A homogeneous distribution here is characterized in that the adhesive composition of the invention after curing has just one glass transition point determined by means of DSC.

The examples which follow serve only to illustrate the invention. They are not intended to limit the scope of protection of the patent claims in any way.

EXAMPLES

Description of the Test Methods

Pendulum hardness analogously to DIN EN ISO 1522: the pendulum damping test is a method of determining the viscoelastic properties of adhesives to DIN EN ISO 1522 in a pendulum damping instrument and is thus a measure of the hardness thereof. It consists of a sample table on which a pendulum can swing freely on a sample surface and a counter. The number of swings in a defined angle range is a measure of the hardness of an adhesive and is reported in seconds or number of swings.

Tensile test (DIN EN 1465). What is ascertained is the bond strength t bond as force/area in MPa (or $N/mm^2$) for shear stresses (tensile shear strength). Standardized sample geometry: adherend: 100×25×1.6 mm; adhesive bond: 12.5×25 mm.

Water resistance to DIN EN 204 D4: Classification of thermoplastic wood adhesives for non-structural applications after storage in water.

Formulation:

The adhesives of the invention are mixed in 2 stages. First the component (A) containing the hydrophilized isocyanate and, in parallel, the aqueous component (B) were mixed, each in a dissolver at 1500 rpm for at least 2 min. Thereafter, the two components were again mixed by means of a dissolver at 1500 rpm in the desired composition for at least 1 min.

The sequence of addition of the constituents to the dissolver for components A and B and for the mixture of A and B was:

A: isocyanate phase: 1. hydrophilized isocyanates, 2. further organic constituents, 3. additives, 4. fillers, 5. catalysts.

B: water phase: 1. water, 2. organic constituents, 3. additives, 4. fillers, 5. catalysts. A+B: 1. component A, 2. component B Application:

15 min after mixing, the adhesives were drawn down by means of a drawdown bar in thickness 0.12 mm onto both desired substrates to be bonded. The adhesive mixture on the substrate was vented at 23° C. for 10 min until the majority of the aqueous phase had evaporated, and the two substrates to be bonded were subsequently pressed with a pressure of 50 $N/cm^2$ at RT for 24 h. After 7 days, drawdown shear strength was measured in accordance with DIN EN 1465: 2009-07 and water resistance in accordance with DIN EN 204 D4. In both cases, the variance consisted in the size of the test specimen.

Raw Materials Used:

Dried beechwood in pieces, 2 cm*5 cm*0.4 cm. In a departure from DIN EN 1465 and DIN EN 204, the piece of beechwood was bonded with an overlap of 4 $cm^2$.

Application thickness to the substrate prior to joining: in each case about 100 $g/m^2$ wet, about 60 $g/m^2$ dry.

Excess adhesive that was expressed from the bonded join was cautiously removed after curing with a razor blade at the edge of the bonded join prior to the tensile test.

Hydrophilized Isocyanates:

Hydrophilic aliphatic polyisocyanate based on hexamethylene diisocyanate, having a viscosity of 3500±1000 mPa·s to M014-ISO 3219/A.3 at 23° C., NCO content 20.3-21.3% by weight M105-ISO 11909, 11909, Hazen color number <60 M017-EN 1557, monomeric HDI≤0.24% M106-ISO 10283, flashpoint about 192° C. DIN EN ISO 2719, density about 1.16 $g/cm^3$ DIN EN ISO 2811, sourced as Bayhydur XP 2655 from Covestro Deutschland AG Polyols Ethylene glycol, butane-1,4-diol, diethylene glycol, glycerol were sourced from Aldrich.

Linear aliphatic polycarbonate ester diol, acid number ≤3 mg KOH/g DIN EN ISO 2114, viscosity at 23° C. 30 500±5500 mPa·s DIN EN ISO 3219, hydroxyl content 6.5±0.45% DIN 53 240/2, water content ≤0.1% DIN 51 777/1, equivalent weight about 260, density at 20° C. about 1.17 g/ml DIN EN ISO 2811-2, flashpoint about 150° C. DIN EN ISO 2719, pour point approx. −3° C. DIN ISO 3016, *Theory, sourced as Desmophen C 1100 from Covestro Deutschland AG Anionic, high molecular weight polyurethane dispersion, about 50% in water, nonvolatile content (1 g/l h/125° C.) 49-51% DIN EN ISO 3251, viscosity at 23° C. spindle L 2/30 rpm. 40-600 mPa·s DIN 53 019, pH 6.0-9.0 DIN ISO 976. Minimum film formation temperature about 5° C. DIN ISO 2115, sourced as Desmophen U54 from Covestro Deutschland AG.

Additives

DBTL (catalyst) was sourced from TIBChemicals as TIBKAT 218

Lithium molybolate was prepared by the method from DE 102006005165 A1 and used as catalyst in the isocyanate phase.

| Inventive examples are identified by * | | | | | |
|---|---|---|---|---|---|
| | Experiment | | | | |
| | 1* | 2* | 3* | 4* | 5* |
| Composition of isocyanate phase (component A) | | | | | |
| Bayhydur XP (g) | 21 | 21 | 21 | 21 | 21 |
| Composition of water phase (component B) | | | | | |
| Glycerol (g) | | 2.65 | | | |
| Monoethylene glycol (g) | | | 2.27 | | |
| Butane-1.4-diol (g) | | | | 3.16 | |
| Diethylene glycol (g) | | | | | 3.64 |
| Lithium molybdate (g) | 0.1 | 0.1 | 0.1 | 0.1 | 0.1 |
| Water (g) | 16 | 16 | 16 | 16 | 16 |
| | Example | | | | |
| | 1* | 2* | 3* | 4* | 5* |
| Tensile shear strength $N/mm^2$ | 15 | 14.5 | 14.7 | 13.6 | 14.5 |
| D4 criteria met | yes | yes | yes | yes | yes |

In a further experiment, the freezing stability of various formulations was examined. For this purpose, an isocyanate-reactive component A was subjected to heat treatment at −10° C. for 1 h and at 50° C. for 1 h, in 5 repetitions in each case.

The isocyanate-reactive component A showed no change at all after the freeze-thaw cycles. The isocyanate-reactive component B of inventive examples 2-5 was formulated in each case for the freezing stability test so as to give a solids content of 20% by weight.

Comparative examples of the formulations of component B

---

6. Desmophen C1100 20 g thinned with 80 g of water   separate phase
7. Bayhydrol U54 40 g thinned with 60 g of water   coagulated

---

After a cold cycle of 1 h at −10° C. and 1 h at 50° C., in 5 repetitions, all noninventive formulations of component B showed distinct instability manifested by complete coagulation and/or irreversible separation between water phase and polyol phase.

On the basis of polyols of low water solubility and only poor dispersibility, no frost and shear-stable aqueous components B were obtained. If these phases were mixed with an inventive component A after the frost cycle, only inhomogeneous adhesive applications and bonds were obtained after drying.

Inadequate frost and shear stability was observed when conventional aqueous adhesive dispersions and emulsions were used as component B. These products, which are known to be of excellent suitability for use as 2K polyurethane adhesives, thus exhibit poor freezing stability, and therefore complex precautionary measures, for example temperature control, have to be taken in transport and storage.

By contrast, the inventive components B for use in combination with an isocyanate phase comprising a hydrophilized isocyanate in component A exhibit excellent freezing and shear stability. This is manifested in that, even after freezing or high shear stress, the blends in component B form stable phases which, if required, can be converted back to their original form after complete freezing and thawing by simple stirring. It is thus possible for the first time, on the basis of the formulations of the invention, to produce transport- and freezing-stable 2-component isocyanate-based aqueous adhesive formulations.

The invention claimed is:

1. An adhesive composition comprising a water-thinned isocyanate component A having an isocyanate concentration between 2% by weight and 40% by weight, defined as a proportion by weight of the isocyanate group in the overall molecule that contains at least one hydrophilized polyisocyanate, the isocyanate groups of which are in direct contact with water, wherein at least 90% of free isocyanate groups of the isocyanate component A that were present prior to thinning the isocyanate component A with water are still present in the water-thinned isocyanate component A, wherein the isocyanate component A is in the form of a dispersion having an average particle size of not more than 1000 nm or of an aqueous solution, and wherein the adhesive composition has a content of polymeric polyols of not more than 10% by weight.

2. The adhesive composition as claimed in claim 1, wherein the hydrophilized polyisocyanate has been hydrophilized by an external emulsifier not covalently bonded to the polyisocyanate.

3. The adhesive composition as claimed in claim 1, wherein the hydrophilized polyisocyanate has been hydrophilized by an internal emulsifier covalently bonded to the polyisocyanate.

4. The adhesive composition as claimed in claim 1, wherein the polymeric polyols have a number-average molecular weight of at least 20 000 g/mol.

5. The adhesive composition as claimed in claim 1, wherein the water content used to thin the isocyanate component A is such that the viscosity, determined to M014-ISO 3219/A.3, of the thinned isocyanate component A is lowered by at least 40% compared to an otherwise identical but anhydrous isocyanate component A.

6. The adhesive composition as claimed in claim 1, additionally comprising a trimerization catalyst C.

7. The adhesive composition as claimed in claim 1, additionally comprising an isocyanate-reactive component B having a molecular weight of not more than 4500 g/mol and a water solubility of at least 50 g/l.

8. The adhesive composition as claimed in claim 7, wherein the isocyanate-reactive component B comprises at least one of glycerol, monoethylene glycol, butane-1,3-diol, butane-1,4-diol, trimethylolpropane, neopentyl glycol, and diethylene glycol.

9. The adhesive composition as claimed in claim 7, additionally comprising a urethanization catalyst D.

10. The adhesive composition as claimed in claim 1, having an isocyanurate content of at least 50% by weight based on solids content after curing.

11. The adhesive composition as claimed in claim 1, having a glass transition point after curing of at least 80° C.

12. A method of producing a bonded joint, comprising
  a) thinning an isocyanate component A containing at least one hydrophilized polyisocyanate with water to form a water-thinned isocyanate component A, such that the isocyanate groups of the hydrophilized isocyanate are in direct contact with water, wherein the water-thinned isocyanate component A has an isocyanate concentration between 2% by weight and 40% by weight based on a total weight of the isocyanate component A;
  b) applying an adhesive composition comprising the water-thinned isocyanate component A obtained in method step a) to at least one substrate and contacting the coated substrate with at least one second substrate, wherein at least 90% of the free isocyanate groups of the isocyanate component A that were present at the start of method step a) are still present at the start of method step b); and
  c) curing the adhesive composition to form an adhesive bond, with the proviso that the curing adhesive composition has a content of polymeric polyols of not more than 10% by weight.

13. The method as claimed in claim 12, wherein, in method step a), the isocyanate component A or water-thinned isocyanate component A is mixed with a water-dissolved isocyanate-reactive component B prior to performance of method step b).

14. A product of the adhesive bond obtained from the method as claimed in claim 12.

15. A method of bonding porous substrates, comprising contacting the porous substrates with the adhesive composition according to claim 1 and curing the adhesive composition to form an adhesive bond between the porous substrates.

* * * * *